(12) United States Patent
Umeda et al.

(10) Patent No.: US 10,186,725 B2
(45) Date of Patent: Jan. 22, 2019

(54) POLYMER ELECTROLYTE COMPOSITION AND POLYMER ELECTROLYTE MEMBRANE, POLYMER ELECTROLYTE MEMBRANE WITH CATALYST LAYER, MEMBRANE ELECTRODE ASSEMBLY, AND POLYMER ELECTROLYTE FUEL CELL EACH USING THE SAME

(71) Applicants: Toray Industries, Inc., Tokyo (JP); Daimler AG, Stuttgart (DE); Ford Motor Company, Dearborn, MI (US)

(72) Inventors: Hiroaki Umeda, Otsu (JP); Daisuke Izuhara, Otsu (JP); Yuka Fujieda, Otsu (JP); Jing Li, Surrey (CA); Yunsong Yang, Richmond (CA); Keping Wang, Surrey (CA)

(73) Assignees: Toray Industries, Inc. (JP); Daimler AG (DE); Ford Motor Company, Dearborn, MI (US)

( * ) Notice: Subject to any disclaimer, the term of this patent is extended or adjusted under 35 U.S.C. 154(b) by 212 days.

(21) Appl. No.: 15/302,213

(22) PCT Filed: Apr. 6, 2015

(86) PCT No.: PCT/JP2015/001928
§ 371 (c)(1),
(2) Date: Oct. 6, 2016

(87) PCT Pub. No.: WO2015/155979
PCT Pub. Date: Oct. 15, 2015

(65) Prior Publication Data
US 2017/0033387 A1 Feb. 2, 2017

(30) Foreign Application Priority Data

Apr. 7, 2014 (JP) .................................. 2014-078759

(51) Int. Cl.
| | |
|---|---|
| H01M 8/1048 | (2016.01) |
| H01M 8/1025 | (2016.01) |
| H01M 8/1032 | (2016.01) |
| H01M 8/1023 | (2016.01) |
| H01M 8/1039 | (2016.01) |
| H01B 1/12 | (2006.01) |
| C08J 5/22 | (2006.01) |
| C08K 3/10 | (2018.01) |
| C08K 5/3432 | (2006.01) |
| C08K 5/49 | (2006.01) |
| C08L 71/00 | (2006.01) |
| H01M 8/1051 | (2016.01) |

(Continued)

(52) U.S. Cl.
CPC .......... *H01M 8/1048* (2013.01); *C08J 5/2256* (2013.01); *C08K 3/10* (2013.01); *C08K 5/3432* (2013.01); *C08K 5/3437* (2013.01); *C08K 5/49* (2013.01); *C08K 5/50* (2013.01); *C08L 71/00* (2013.01); *H01B 1/122* (2013.01); *H01M 8/1023* (2013.01); *H01M 8/1025* (2013.01); *H01M 8/1032* (2013.01); *H01M 8/1039* (2013.01); *H01M 8/1051* (2013.01); *C08J 2361/16* (2013.01); *C08J 2371/00* (2013.01); *C08J 2381/06* (2013.01); *C08L 101/12* (2013.01); *H01M 2008/1095* (2013.01)

(58) Field of Classification Search
CPC ........ C08L 71/12; C08L 101/12; C08L 71/00; C08K 5/3437; C08K 5/50; C08K 3/10; C08K 5/3432; C08K 5/49; C08J 2361/16; C08J 2371/00; C08J 2381/06; C08J 5/2256; H01B 1/122; H01M 2008/1095; H01M 8/1023; H01M 8/1025; H01M 8/1032; H01M 8/1039; H01M 8/1048; H01M 8/1051

See application file for complete search history.

(56) References Cited

U.S. PATENT DOCUMENTS

| | | | | |
|---|---|---|---|---|
| 2009/0253015 A1* | 10/2009 | Onodera | ................ | C08G 61/12 429/493 |
| 2011/0111321 A1 | 5/2011 | Yang et al. | | |
| 2012/0225361 A1* | 9/2012 | Wang | .................. | H01M 8/1023 429/409 |

FOREIGN PATENT DOCUMENTS

| | | |
|---|---|---|
| CN | 1902777 | 1/2007 |
| EP | 1 289 041 A2 | 3/2003 |

(Continued)

OTHER PUBLICATIONS

Feng Wang et al., "Direct polymerization of sulfonated poly(arylene ether sulfone) random (statistical) copolymers: candidates for new proton exchange membranes," Journal of Membrane Science, vol. 197, Issues 1-2, Mar. 15, 2002, pp. 231-242 (Abstract).

*Primary Examiner* — Carlos Barcena
(74) *Attorney, Agent, or Firm* — DLA Piper LLP (US)

(57) ABSTRACT

An excellent polymer electrolyte composition has excellent chemical stability of being resistant to strong oxidizing atmosphere during operation of fuel cell, and achieves excellent proton conductivity under low-humidification conditions, excellent mechanical strength and physical durability. A polymer electrolyte membrane, a membrane electrode assembly, and a polymer electrolyte fuel cell each use the same. The polymer electrolyte composition contains an ionic group-containing polymer (A), a phosphorus-containing additive (B), and a nitrogen-containing aromatic additive (C), the phosphorus-containing additive (B) and the nitrogen-containing aromatic additive (C) being a compound represented by specific structural formulae.

15 Claims, No Drawings

(51) Int. Cl.
    *C08K 5/3437* (2006.01)
    *C08K 5/50* (2006.01)
    C08L 101/12 (2006.01)
    H01M 8/1018 (2016.01)

(56) References Cited

FOREIGN PATENT DOCUMENTS

| | | |
|---|---|---|
| EP | 1 777 768 A1 | 4/2007 |
| JP | 02-016126 A | 1/1990 |
| JP | 02-208322 A | 8/1990 |
| JP | 2000-011756 A | 1/2000 |
| JP | 2003-151346 A | 5/2003 |
| JP | 2003-201403 A | 7/2003 |
| JP | 2005-213325 A | 8/2005 |
| JP | 2005-290318 A | 10/2005 |
| JP | 2006-099999 A | 4/2006 |
| JP | 2007-038213 A | 2/2007 |
| JP | 2007-066882 A | 3/2007 |
| JP | 2009-235260 A | 10/2009 |
| WO | 2005/060039 | 6/2005 |
| WO | 2011/057768 A2 | 5/2011 |
| WO | 2011/057769 A1 | 5/2011 |
| WO | 2013/094538 A1 | 6/2013 |
| WO | 2014/084138 A1 | 6/2014 |

\* cited by examiner

US 10,186,725 B2

POLYMER ELECTROLYTE COMPOSITION AND POLYMER ELECTROLYTE MEMBRANE, POLYMER ELECTROLYTE MEMBRANE WITH CATALYST LAYER, MEMBRANE ELECTRODE ASSEMBLY, AND POLYMER ELECTROLYTE FUEL CELL EACH USING THE SAME

TECHNICAL FIELD

This disclosure relates to a polymer electrolyte composition, a polymer electrolyte membrane, a membrane electrode assembly, and a polymer electrolyte fuel cell each using the same.

BACKGROUND

Fuel cells are a kind of power generator that extract electric energy through electrochemical oxidation of fuels such as hydrogen and methanol. In recent years, fuel cells have drawn attention as a clean energy supply source. Among fuel cells, a polymer electrolyte fuel cell is operated at a low standard working temperature of approximately 100° C., and provides high energy density, and thus is expected to be widely applied as relatively small-scale distributed power facilities and as mobile power generator on automobiles, ships and the like. In addition, the polymer electrolyte fuel cell also draws attention as power source of small-scale mobile apparatus and portable apparatus, and is expected to be mounted on cell phones, personal computers and the like, in place of secondary battery such as nickel-hydrogen battery and lithium-ion battery.

A normal fuel cell is constituted of cell units, the cell unit having a configuration of a membrane electrode assembly (hereinafter referred to also as MEA) being sandwiched between separators, which MEA is constituted of an anode electrode and a cathode electrode in which a reaction of power generation occurs, and a polymer electrolyte membrane serving as a proton conductor between the anode and the cathode. Although the main component of the polymer electrolyte membrane is an ionic group-containing polymer (polymer electrolyte material), a polymer electrolyte composition containing an additive and the like can also be used to increase durability.

The characteristics required of the polymer electrolyte membrane include, first, high proton conductivity, specifically high proton conductivity even under high temperature and low-humidification conditions. Since the polymer electrolyte membrane also functions as the barrier that prevents direct reaction between fuel and oxygen, low permeability of fuel is required. Other characteristics include chemical stability to withstand a strong oxidizing atmosphere during operation of the fuel cell, mechanical strength and physical durability of being capable of withstanding thinning of the membrane and repeated swell-drying cycles.

Conventionally, as the polymer electrolyte membranes, there is widely used Nafion (registered trademark, manufactured by DuPont) which is a perfluorosulfonic acid based polymer. Since Nafion (registered trademark) is manufactured through multistage synthesis, it has a problem of being extremely expensive and large fuel-crossover (transmission amount of fuel). In addition, as to Nafion, there have been pointed out a problem of losing membrane mechanical strength and physical durability by swelling-drying, a problem in which the use at high temperatures is not possible because of low softening point, a problem of waste disposal after use, and further an issue of difficulty in recycling the material. On the other hand, the development of hydrocarbon-based electrolyte membranes has been also actively conducted in recent years as a polymer electrolyte membrane having excellent membrane characteristics at a low price and being capable of substituting for Nafion (registered trademark).

However, those polymer electrolyte membranes have a problem of insufficient chemical stability in the use for polymer electrolyte fuel cells. Although the mechanism of chemical deterioration has not yet fully been clarified, it is believed that, as a result of break of the polymer chain and the side chain by hydrogen peroxide having strong oxidizing power produced during power generation, and hydroxy radical produced by a reaction of a very small amount of metal such as iron which may exist in the system with hydrogen peroxide, due to thinning and weakening of the polymer electrolyte membrane and increase in fuel permeation, hydrogen peroxide, hydroxy radical and the like are further produced, and membrane degradation progresses with increasing speed. In addition, during repeated swelling and shrinking in association with changes in humidity, there has been a problem in which the weakened polymer electrolyte membrane breaks and thus power generation does not become possible.

In the above situation, there have been conducting studies to improve the chemical stability and durability by using a polymer electrolyte composition applying perfluoro-based electrolyte membrane and hydrocarbon-based electrolyte membrane each containing antioxidant.

For example, Japanese Patent Laid-Open Nos. 2003-151346 and 2000-11756 propose polymer electrolyte compositions adding a phosphorous-based antioxidant. Specifically, a polymer electrolyte composition adding a phosphorous acid ester (phosphite)-based antioxidant to a sulfonic acid group-containing polyethersulfone-based polymer, and a polymer electrolyte composition adding a phosphonic acid group-containing polymer such as polyvinylphosphonic acid to a sulfonic acid group-containing polyethersulfone-based polymer or a sulfonic acid group-containing polyetherketone-based polymer are proposed.

Japanese Patent Laid-Open Nos. 2003-201403, 2007-66882 and 2005-213325 propose electrolyte compositions adding sulfur-based, amine-based, phenol-based antioxidants and the like, in addition to phosphorous-based antioxidants. Specifically, a polymer electrolyte composition adding an antioxidant such as phosphorous acid ester (phosphite), thioether, hindered amine or hindered phenol to a sulfonic acid group-containing polyethersulfone-based polymer or a sulfonic acid group-containing polyarylene-based polymer are proposed.

Japanese Patent Laid-Open No. 2006-99999 proposes a polymer electrolyte composition adding cerium ion or manganese ion to a perfluorosulfonic acid-based polymer and a sulfonic acid group-containing polyetherketone-based polymer.

WO 2013/94538 A proposes a polymer electrolyte composition adding a phosphorus-containing additive selected from phosphine compounds and phosphinite compounds, and further a transition metal atom such as cerium or manganese.

Japanese Patent Laid-Open No. 2007-38213 proposes a peroxide decomposition catalyst coordinated to a base metal atom such as manganese or iron by a nitrogen atom such as imidazole or pyridine. WO 2011/57768 A and WO 2011/57769 A propose a polymer electrolyte composition adding a phenanthroline derivative or a complex of phenanthroline and cerium ion or manganese ion to a perfluoro-based electrolyte membrane.

However, in the polymer electrolyte compositions described in JP '346, JP '756, JP '403, JP '882 and JP '325, a general antioxidant and a light stabilizer that suppresses deterioration of plastic materials due to heat and light are only added, and they cannot obtain satisfactory chemical stability and durability of polymer electrolyte compositions under the conditions like fuel cell operating environments (high temperature, humidified, strong acidity).

Also, 2,2'-bipyridyl and 1,10-phenanthroline described in WO '768 may be oxidized by hydrogen peroxide and hydroxy radical produced during operation and eluted outside of the membrane. Thus, they cannot be said to obtain satisfactory chemical stability and durability.

In addition, in JP '999, because the sulfonic acid group is ion-exchanged by cerium ion or manganese ion that is a polyvalent metal, there are problems of deterioration of proton conductivity of the polymer electrolyte composition, deterioration of solvent solubility and solution membrane-forming ability due to ion cross-linking, and embrittlement of the membrane.

Further, a phosphorous-based additive in WO '538, 2,2'-bipyridyl in JP '213, 1,10-phenanthroline in WO '769 and the like are allowed to form a coordination (complex) structure with the metal, thereby relaxing the ion cross-linking, and improving durability while maintaining solvent solubility and membrane-forming ability. However, the complex structure is comparatively hydrophilic and may be eluted outside of the membrane during operation, thus they cannot be still said to obtain satisfactory chemical stability and durability.

As described above, the prior art polymer electrolyte compositions are insufficient in economy, processability, proton conductivity, mechanical strength, chemical stability, and physical durability. Thus, they cannot serve as industrially useful polymer electrolyte compositions.

It could therefore be helpful to provide a highly practically applicable polymer electrolyte composition having excellent chemical stability of being able to be resistant to a strong oxidizing atmosphere during operation of fuel cell, and being capable of achieving excellent proton conductivity under low-humidification conditions, excellent mechanical strength and physical durability, and provide a polymer electrolyte membrane, a membrane electrode assembly, and a polymer electrolyte fuel cell each using the same.

SUMMARY

We thus provide a polymer electrolyte composition comprising an ionic group-containing polymer (A), a phosphorus-containing additive (B) and a nitrogen-containing aromatic additive (C), the phosphorus-containing additive (B) being at least one kind selected from a compound represented by general formula (B1) and a compound represented by general formula (B2), and the nitrogen-containing aromatic additive (C) being at least one kind selected from a compound represented by general formula (C1) and a compound represented by general formula (C2).

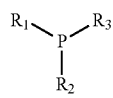
(B1)

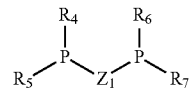
(B2)

where, in general formulae (B1) and (B2), $R_1$ to $R_7$ each independently represent a substituent selected from hydrocarbon groups having a straight chain, a cyclic, or a branched structure, represented by general formula $C_mH_n$ (m and n are an integer number), alkoxy groups having a straight chain, a cyclic, or a branched structure, represented by general formula $OC_mH_n$ (m and n are an integer number), halogen atoms and a hydrogen atom; $Z_1$ represents a divalent substituent selected from hydrocarbon groups having a straight chain, a cyclic, or a branched structure, represented by general formula $C_mH_n$ (m and n are an integer number) and alkoxy groups having a straight chain, a cyclic, or a branched structure, represented by general formula $OC_mH_n$ (m and n are an integer number) or $OC_mH_nO$ (m and n are an integer number); m and n are independent in each formula; and $R_1$ to $R_7$, and $Z_1$ may arbitrarily bind to form a cyclic structure as represented by general formulae (B1a) and (B2a).

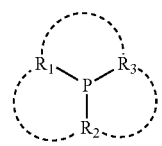
(B1a)

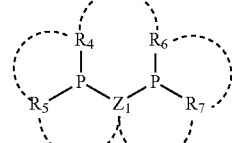
(B2a)

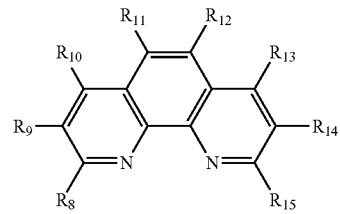
(C1)

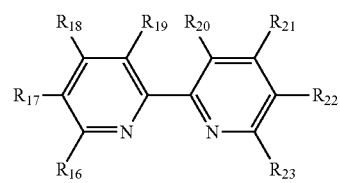
(C2)

where, in general formulae (C1) and (C2), $R_8$ to $R_{23}$ each independently represent a substituent selected from hydrocarbon groups having a straight chain, a cyclic, or a branched structure, represented by general formula $C_mH_n$ (m and n are an integer number), alkoxy groups having a straight chain, a cyclic, or a branched structure, represented by general formula $OC_mH_n$ (m and n are an integer number), halogen atoms, a hydrogen atom, carboxyl groups, carboxylate groups, sulfonic acid groups, sulfate groups, hydroxyl groups, amino groups, cyano groups and nitro groups; and m and n are independent in each formula.

We provide a practically excellent polymer electrolyte composition having excellent chemical stability of being resistant to strong oxidizing atmosphere, and achieving excellent proton conductivity under low-humidification conditions, excellent mechanical strength and physical durability; a polymer electrolyte membrane, a membrane electrode assembly, and a polymer electrolyte fuel cell each using the same.

DETAILED DESCRIPTION

Hereinafter, our compositions, membranes, layers, assemblies and fuel cells will be described in detail. We found out that the addition of a specific phosphorus-containing additive (B) to an ionic group-containing polymer (A), and further addition of a specific nitrogen-containing aromatic additive (C) make it possible to cause a polymer electrolyte composition, specifically a polymer electrolyte membrane for fuel cell, to express excellent performances in proton conductivity and power generation characteristics also under low-humidification conditions, processability such as membrane-forming, chemical durability such as oxidation resistance, radical resistance, and hydrolysis resistance, and physical durability such as mechanical strength of membrane and hot water resistance.

The additive means a compound other than the ionic group-containing polymer (A) contained in the polymer electrolyte composition, and a compound mixed to the ionic group-containing polymer. The "additive" is one mainly functioning as an antioxidant, and is a compound having at least one of the functions described in, for example, "Polymer Additives Handbook" pp. 6 to 77, 2010, CMC Publishing Co., Ltd.: a function as "radical chain initiation inhibitor (metal inactivator)" which inactivates metallic ion (such as $Fe^{2+}$ and $Cu^{2+}$) functioning as the catalyst to generate hydroxy radical and peroxide radical, thus hindering the initiation of chain reaction by the radicals; a function as "radical scavenger" that inactivates the generated hydroxy radical and peroxide radical to suppress the chain reaction by hydroxy radical and peroxide radical; and a function as "peroxide decomposer" that hinders the reaction of decomposition of hydrogen peroxide to become radical.

Although the mechanism of improving durability has not fully been clarified, we assume the following two mechanisms:
1. A function-separated mechanism in which, while the phosphorus-containing additive represented by general formula (B1) or (B2) exhibits high functions as "peroxide decomposer" or "radical scavenger" that scavenges, decomposes, and detoxifies hydroxy radical, peroxide radical and hydrogen peroxide having strong oxidizing power, the nitrogen-containing aromatic additive represented by general formula (C1) or (C2) is strongly coordinated to a very small amount of metal existing in the system to promote production of hydroxy radical and peroxide radicals and inactivates the metal to function as a "metal inactivator." Alternatively, a function-separated mechanism in which, the phosphorus-containing additive functions as "metal inactivator," and the nitrogen-containing aromatic additive functions as "peroxide decomposer" or "radical scavenger."
2. While the oxide of a nitrogen-containing aromatic compound represented by general formula (C1) or (C2) produced by detoxifying hydrogen peroxide or hydroxy radical is reduced by the phosphorus-containing additive represented by general formula (B1) or (B2) to return to the original nitrogen-containing aromatic compound, the oxide of the phosphorus-containing additive inferior in elution resistance is reduced by hydrogen generated during operation of fuel cell to return to the original phosphorus-containing additive. A mechanism suppresses elution of the additive oxide inferior in elution resistance and hot water resistance, and cyclically improves the decomposition efficiency of hydrogen peroxide, hydroxy radical and peroxide radical.

Phosphorus-Containing Additive (B)

The phosphorus-containing additive (B) will be described. The compound used as the phosphorus-containing additive (B) is a compound represented by general formula (B1) or (B2).

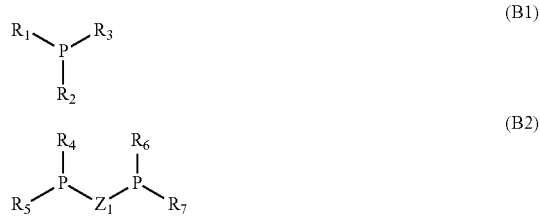

where, in general formulae (B1) and (B2), $R_1$ to $R_7$ each independently represent a substituent selected from hydrocarbon groups having a straight chain, a cyclic, or a branched structure, represented by general formula $C_mH_n$ (m and n are an integer number), alkoxy groups having a straight chain, a cyclic, or a branched structure, represented by general formula $OC_mH_n$ (m and n are an integer number), halogen atoms and a hydrogen atom; $Z_1$ represents a divalent substituent selected from hydrocarbon groups having a straight chain, a cyclic, or a branched structure, represented by general formula $C_mH_n$ (m and n are an integer number) and alkoxy groups having a straight chain, a cyclic, or a branched structure, represented by general formula $OC_mH_n$ (m and n are an integer number) or $OC_mH_nO$ (m and n are an integer number); m and n are independent in each formula; and $R_1$ to $R_7$, and $Z_1$ may arbitrarily bind to form a cyclic structure as represented by general formulae (B1a) and (B2a).

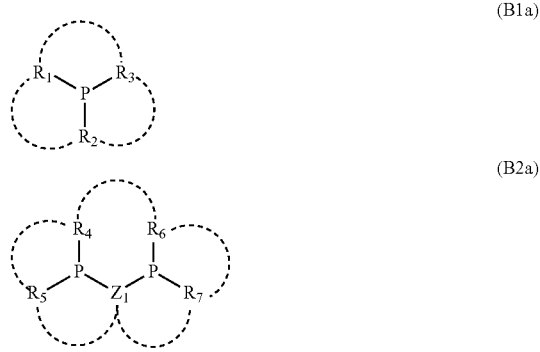

The phosphorus-containing compounds represented by general formulae (B1) and (B2) may be oxidized, during operation of fuel cell, into the respective pentavalent phosphorus oxide-containing compounds. Specifically, as examples of the phosphorus-containing compound represented by general formula (B1), the phosphine compound ($PR_3$) may be oxidized into a phosphine oxide compound represented by general formula $O=PR_3$; the phosphinite compound ($PR_2(OR)$) may be oxidized into a phosphinate compound represented by general formula $O=PR_2(OR)$; the phosphonite compound ($PR(OR)_2$) may be oxidized into a phosphonate compound represented by general formula $O=PR(OR)_2$, and the phosphite (phosphorous acid ester) compound ($P(OR)_3$) may be oxidized into a phosphate (phosphoric acid) compound represented by general formula $O=P(OR)_3$.

Among them, phosphine compounds (compounds, where, in general formulae (B1) and (B2), $R_1$ to $R_7$ and $Z_1$ are all a hydrocarbon group), phosphinite compounds (compounds, where, in general formula (B1), any one of $R_1$ to $R_3$ is represented by $OC_aH_b$ (a and b are an integer), or compounds, where, in general formula (B2), when $Z_1$ is $OC_fH_gO$ (f and g are an integer), $R_4$ to $R_7$ are represented by a hydrocarbon group, and when $Z_1$ is a hydrocarbon group, any one of $R_4$ to $R_5$ is represented by $OC_hH_i$ (h and i are an integer), and any one of $R_6$ to $R_7$ is represented by $OC_jH_k$ (j and k are an integer)) are preferable, and phosphine compounds are most preferable, in terms of elution resistance.

Furthermore, bidentate phosphorus-containing compounds (B2) having two phosphorus atoms are preferable, in terms of coordination ability to a metal, an ability of detoxifying hydrogen peroxide, hydroxy radical and peroxide radical, and reduction efficiency of a nitrogen-containing aromatic compound oxidant, and phosphine compounds having two phosphorus atoms are most preferable, from the viewpoint of hydrolysis resistance and elution resistance. In the bidentate phosphorus-containing compound (B2), it is possible to enhance an effect as a metal inactivator by a chelate effect, enhance an effect as a peroxide decomposer or a radical scavenger, and enhance reduction efficiency of a nitrogen-containing aromatic compound oxidant, while maintaining elution resistance. The chelate effect refers to an effect that, when a ligand is coordinated to a metal, a polydentate ligand (ligand having two or more atoms having coordination ability in a molecule) can better stabilize (inactivate) a complex by formation of a chelate ring, than a monodentate ligand (ligand having one atom having coordination ability in a molecule), and based on the effect, an object substance such as peroxide and an active phosphorous atom in the compound are likely to close to each other.

As the bidentate phosphorus-containing compounds (B2), from the viewpoint of coordination ability to a metal, an ability of detoxifying hydrogen peroxide, hydroxy radical and peroxide radical, and reduction efficiency of a nitrogen-containing aromatic compound oxidant, $Z_1$ is preferably a hydrocarbon group of a straight chain structure represented by general formula $C_mH_n$ (m and n are an integer number), and is further preferably an aliphatic hydrocarbon group of a straight chain structure. Since $Z_1$ is a straight chain hydrocarbon group, high metal inactivating ability, peroxide decomposition ability, radical-scavenging ability, and reducing ability of a nitrogen-containing aromatic compound oxidant can be provided, without inhibiting coordination of the phosphorus atom to a metal and approach to a peroxide, a radical or a nitrogen-containing aromatic compound oxidant. Further, when $Z_1$ is an aliphatic hydrocarbon group of a straight chain structure, as a result of providing a phosphorus-containing compound with flexibility, the above effect can be further enhanced. When $Z_1$ is a hydrocarbon group having a cyclic or a branched structure, a stable coordination structure cannot form with a metal due to steric hindrance or the like, or cannot successfully approach to a peroxide, a radical or a nitrogen-containing aromatic compound oxidant to react (detoxify) them in some cases.

Furthermore, in the hydrocarbon group $C_mH_n$ represented by $Z_1$ in general formula (B2), m is preferably 20 or smaller, further preferably 10 or smaller, and most preferably 6 or smaller, in terms of coordination ability to a metal. When m is 20 or larger, the active phosphorous atoms are separated too far from each other in a molecule and, consequently, metal coordinating ability and peroxide decomposition ability accompanying a chelate effect, radical-scavenging ability, and reduction ability of a nitrogen-containing aromatic compound oxidant are not sufficient in some cases.

It is preferred that the phosphorus-containing additives (B) represented by general formula (B1) and (B2) are a compound wherein at least one of $R_1$ to $R_3$ or at least one of $R_4$ to is an aromatic hydrocarbon group, in terms of chemical stability and production process. The phosphorus-containing additive (B) has at least one aromatic hydrocarbon group, whereby the phosphorus-containing additive (B) can be stabilized by an electronic interaction of between π electron of the aromatic hydrocarbon group and the phosphorus atom, and more stable production process of the polymer electrolyte composition can be constructed.

The phosphorus-containing additive (B) is used in combination with the nitrogen-containing aromatic additive (C), a plurality of kinds of phosphorus-containing additives may be also used and, furthermore, other antioxidant such as thioether, hindered amine or hindered phenol may be also used together.

Specific examples of the phosphine compound include trimethylphosphine, triethylphosphine, tripropylphosphine, triisopropylphosphine, tri-n-butylphosphine, tri-s-butylphosphine, tri-i-butylphosphine, tri-t-butylphosphine, tripentylphosphine, trihexylphosphine, triheptylphosphine, trioctylphosphine, tris(ethylhexyl)phosphine, trinonylphosphine, tridecylphosphine, tris(hydroxymethyl) phosphine, tris(2-carboxyethyl)phosphine, dicyclohexylethylphosphine, di-t-butylneopentylphosphine, diadamantylphosphine, tricyclopentylphosphine, tricyclehexylphosphine, triallylphosphine, tribenzylphosphine, phenylphosphine, tolylphosphine, (2,4,6-tri-t-butylphenyl)phosphine, (methoxyphenyl)phosphine, diphenylphosphine, bis(methoxyphenyl)phosphine, phenyl-di (methoxyphenyl)phosphine, diphenyl(methoxyphenyl) phosphine, tri(methoxyphenyl)phosphine, (hydroxyphenyl) diphenylphosphine, bis(hydroxyphenyl)phenylphosphine, tris(hydroxyphenyl)phosphine, ditolylphosphine, bis(3,5-dimethylphenyl)phosphine, bis(trifluoromethylphenyl)phosphine, di-t-butylphenylphosphine, triphenylphosphine, diphenyltolylphosphine, tris(dimethylphenyl)phosphine, tris (trimethylphenyl)phosphine, diethylphenylphosphine, dicyclohexylphenylphosphine, dicyclohexyltolylphosphine, di cyclohexyl(trimethylphenyl)phosphine, diphenylvinylphosphine, divinylphenylphosphine, trisulfophenylphosphine, tris(pentafluorophenyl)phosphine, tris(trifluoromethylphenyl)phosphine, tritolylphosphine, tri s[4-(3,3,4,4,5,5,6,6,7,7, 8,8,8-tri decafluorooctyl)phenyl]phosphine, trinaphthylphosphine, trifurylphosphine, trithiophenylphosphine, dimethylphenylphosphine, methyldiphenylphosphine, ethyldiphenylphosphine, propyldiphenylphosphine, isopropyldiphenylphosphine, (4-(N,N-dimethylamino)phenyl)-di-t-butylphosphine, dicyclohexyl(methylphenyl)phosphine, diallylphenylphosphine, tris-dimethylaminophosphine, tris-diethylaminophosphine, diphenyltrimethylsilylphosphine, tris(trimethylsilyl)phosphine, diphenylphosphinobenzene sulfonic acid and salts thereof, (phenylphosphinidene)bis (benzene sulfonic acid) and salts thereof, tris(sulfophenyl) phosphine and salts thereof, tris(methylsulfophenyl)phosphine and salts thereof, tris(dimethylsulfophenyl)phosphine and salts thereof, dicyclohexylphosphino-2,6-dimethoxy-1,1'-biphenyl sulfonic acid and salts thereof, compounds represented by the following formulae (B5) to (B79), and the like. The phosphine compounds contained in the polymer electrolyte composition are not limited to the above examples.

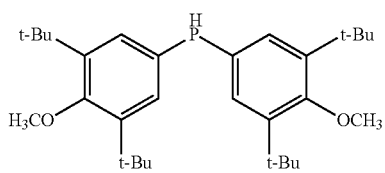
(B5)

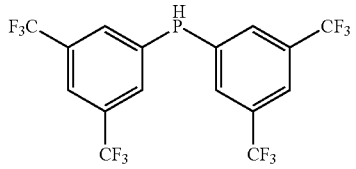
(B6)

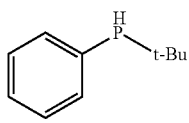
(B7)

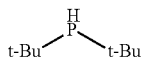
(B8)

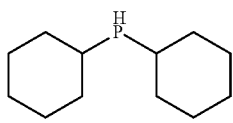
(B9)

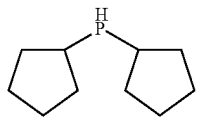
(B10)

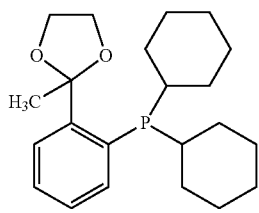
(B11)

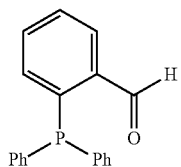
(B12)

-continued

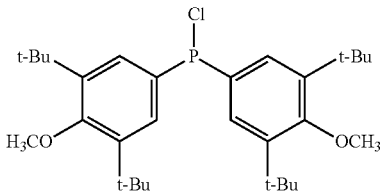
(B13)

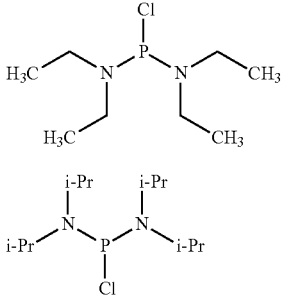
(B14)

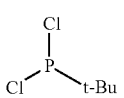
(B15)

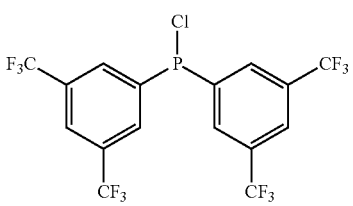
(B16)

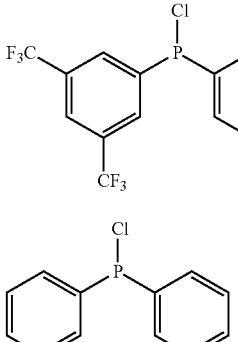
(B17)

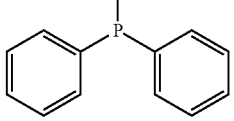
(B18)

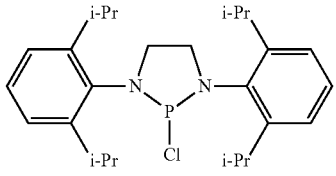
(B19)

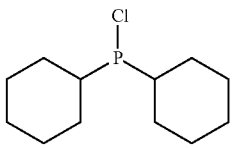
(B20)

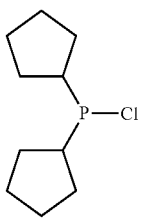
(B21)

(B22)

| | |
|---|---|
| (B23) PCl(i-Pr)₂ | (B34) P(Ph)₂(CH₂Ph) |
| (B24) PCl(o-tolyl)₂ | (B35) Ferrocenyl-PPh (P-phenyl ferrocene) |
| (B25) PCl(t-Bu)₂ | (B36) P(t-Bu)(Cy)₂ |
| (B26) PCl₂(Et) | (B37) P(t-Bu)(i-Pr)₂ |
| (B27) PCl₂(i-Pr) | (B38) 2-(diphenylphosphino)benzoic acid |
| (B28) PCl₂(CH₃) | (B39) P(t-Bu)₂–C(CH₃)–CH₂–C(Ph)₂ (cyclopropane) |
| (B29) PCl₂(Ph) | (B40) P(Cy)(Ph)₂ |
| (B30) PCl₂(NEt₂) | (B41) P(Ph)(CH₂CH=CH₂)₂ |
| (B31) PCl₂(N(i-Pr)₂) | (B42) P(CH₃)(t-Bu)₂ |
| (B32) PCl₂(NMe₂) | |
| (B33) P(Ph)₂(CH₂CH=CH₂) | |

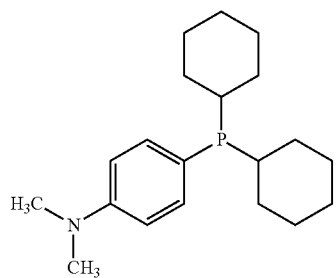
(B43)
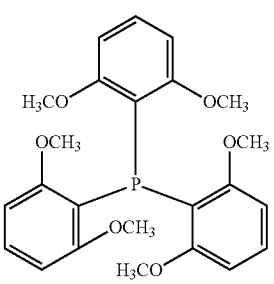
(B49)
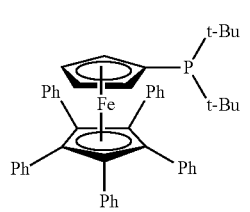
(B44)
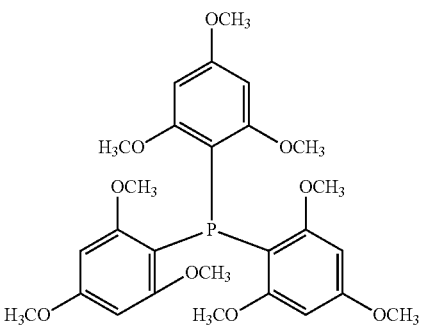
(B50)
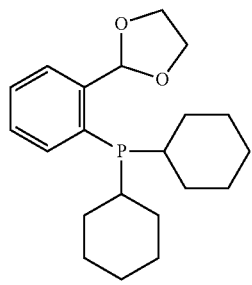
(B45)
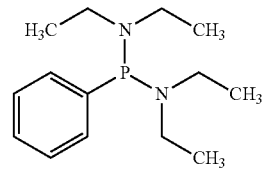
(B52)
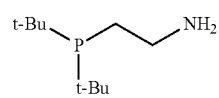
(B53)
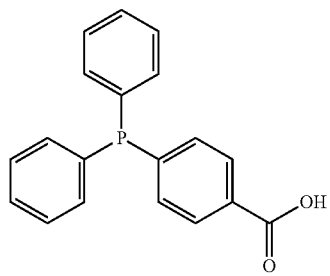
(B46)
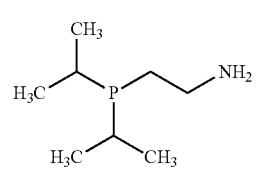
(B55)
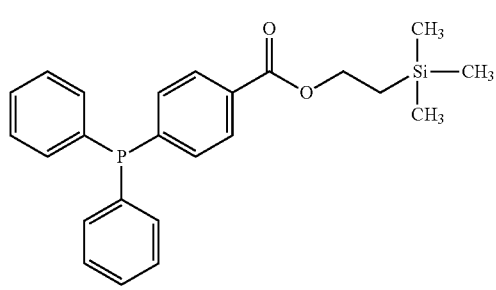
(B47)
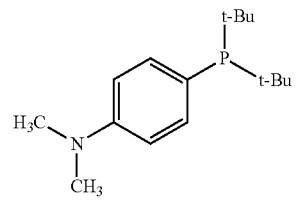
(B56)
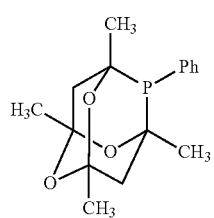
(B48)
(B57)

(B58) 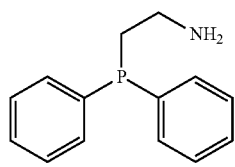
(B60) 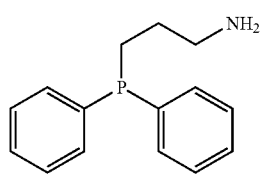
(B62) 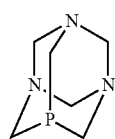
(B63) 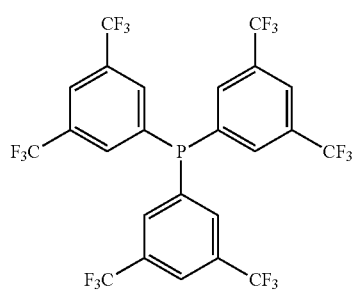
(B64) 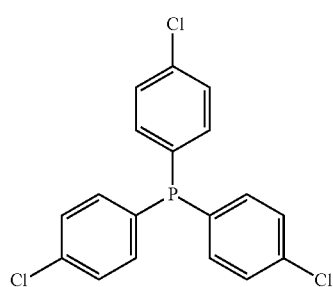
(B65) 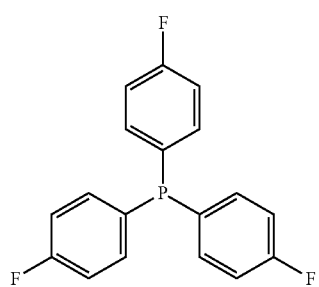
(B66) 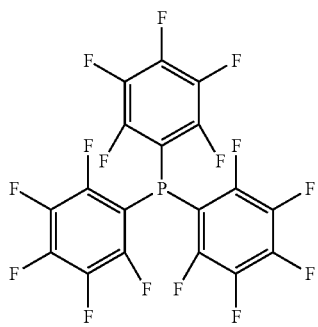
(B67) 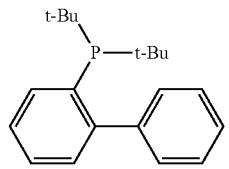
(B68) 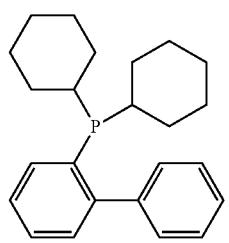
(B69) 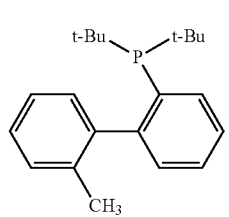
(B70) 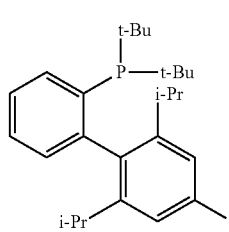
(B71) 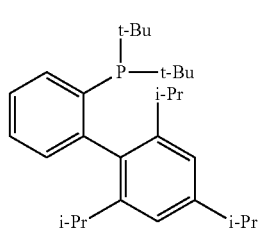

(B72) 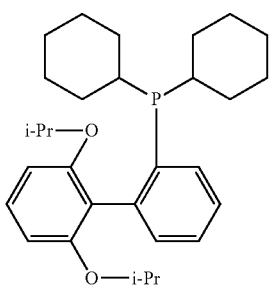

(B73) 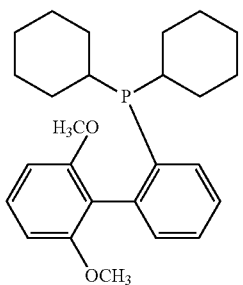

(B74) 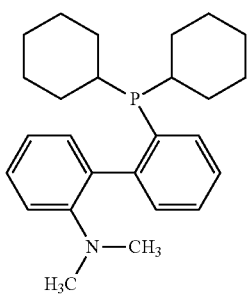

(B75) 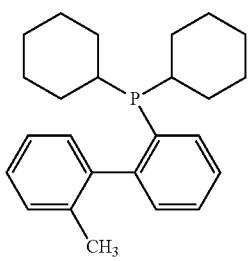

(B76) 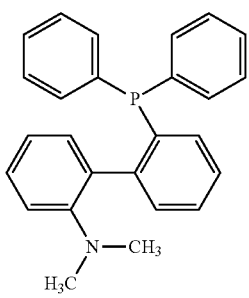

(B77) 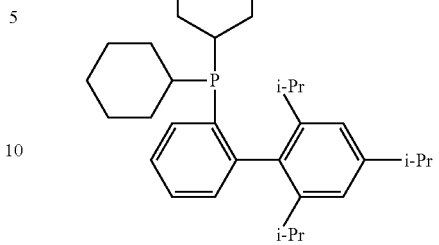

(B78) 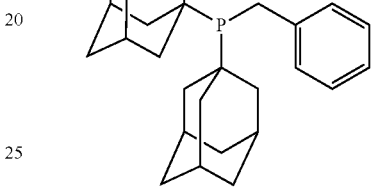

(B79) 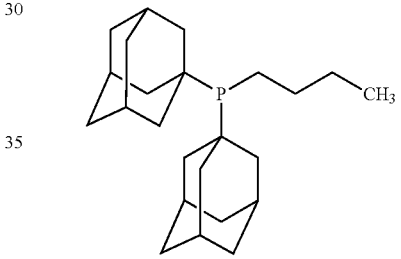

Also, specific examples of the bidentate phosphine compound include bis(diphenylphosphino)methane, bis(diphenylphosphino)ethane, bis(diphenylphosphino)propane, bis(diphenylphosphino)butane, bis(diphenylphosphino)pentane, bis(diphenylphosphino)hexane, bis(diphenylphosphino)heptane, bis(diphenylphosphino)octane, bis(diphenylphosphino)nonane, bis(diphenylphosphino)decane, bis[bis(pentafluorophenyl)phosphino]ethane, bis(diphenylphosphino)ethylene, bis(diphenylphosphino)acetylene, bis[(phenylpropane sulfonic acid)phosphine]butane and salts thereof, ((diphenylphosphino)phenyl)diphenylphosphine, bis(dimethylphosphino)methane, bis(dimethylphosphino)ethane, bis(diethylphosphino)ethane, bis(dicyclohexylphosphino)methane, bis(dicyclohexylphosphino)ethane, bis(dicyclohexylphosphino)propane, bis(dicyclohexylphosphino)butane, bis(diphenylphosphino)benzene, bis(diphenylphosphinophenyl)ether, bis(diphenylphosphino)benzophenone, 2,2'-bis(diphenylphosphino)-1,1'-binaphthyl (hereinafter also referred to as BINAP), bis(diphenylphosphinomethyl)benzene, bis(dicyclohexylphosphinophenyl)ether, bis(dicyclohexylphosphino)benzophenone, phenylenebiphosphine, and tetraphenylbiphosphine, compounds represented by the following formulae (B87) to (B110) and the like.

(B87) 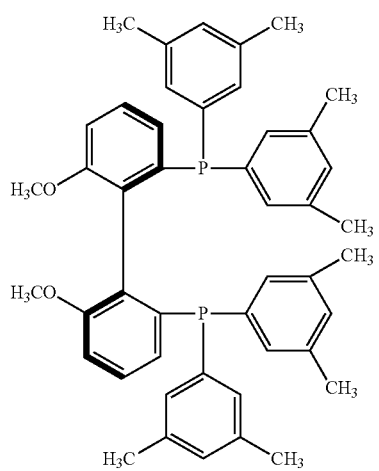
(B90) 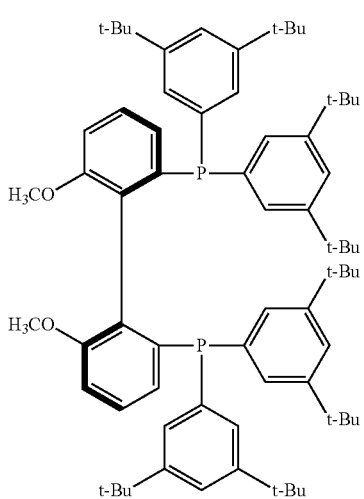
(B88) 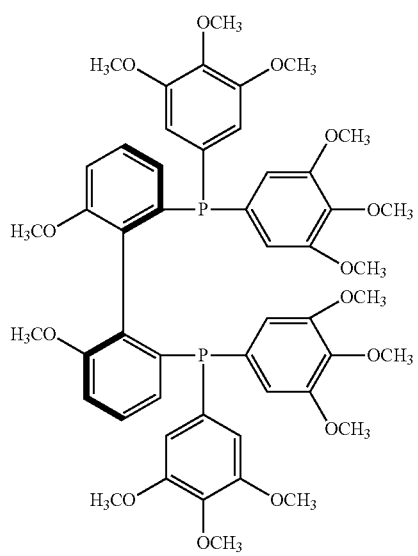
(B91) 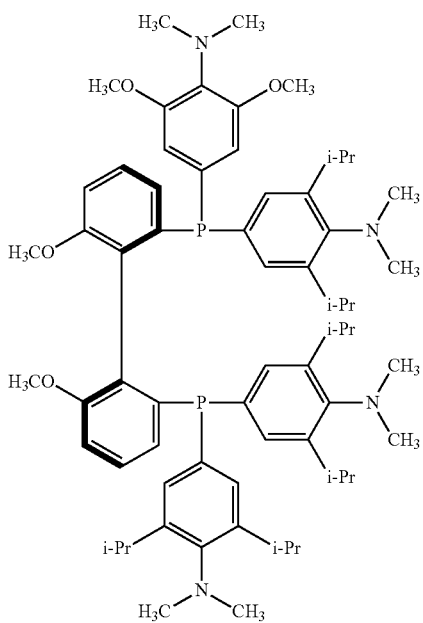
(B89) 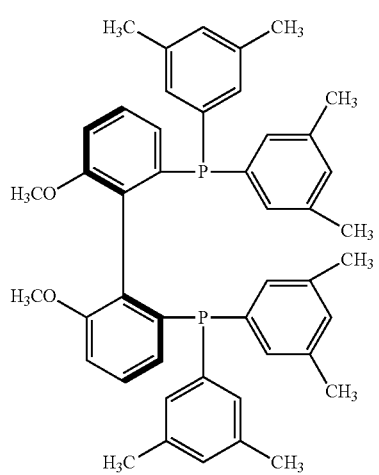
(B92) 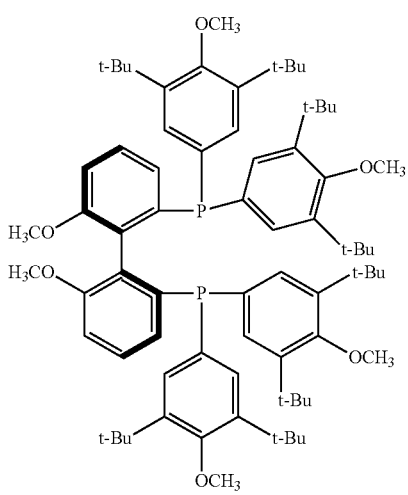

(B93) 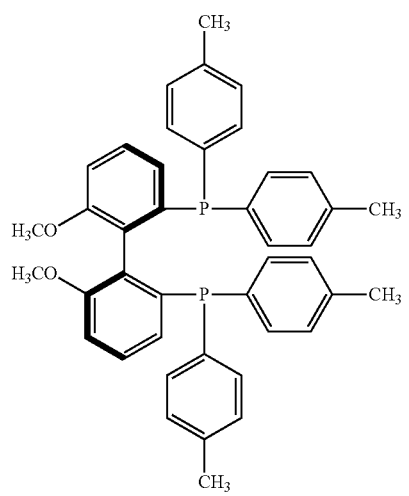
(B96) 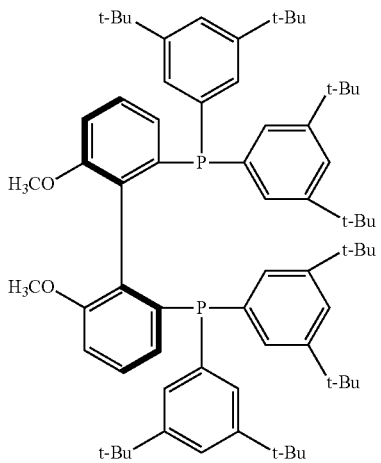
(B94) 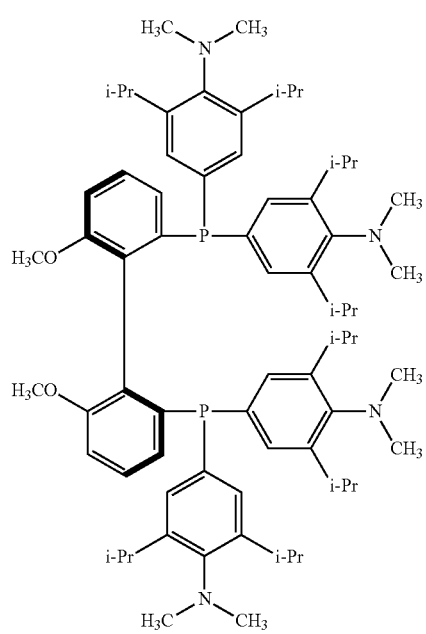
(B97) 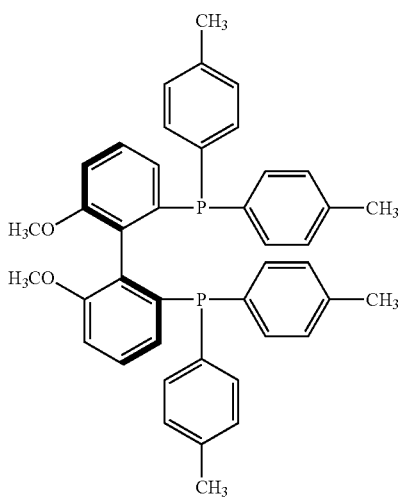
(B95)
(B98) 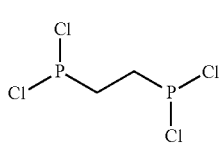
(B99) 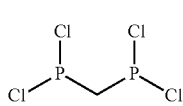
(B100) 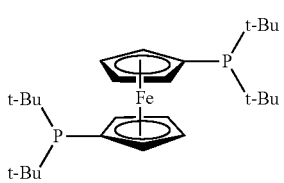
(B101) 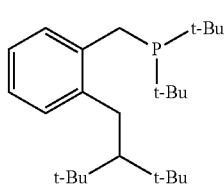

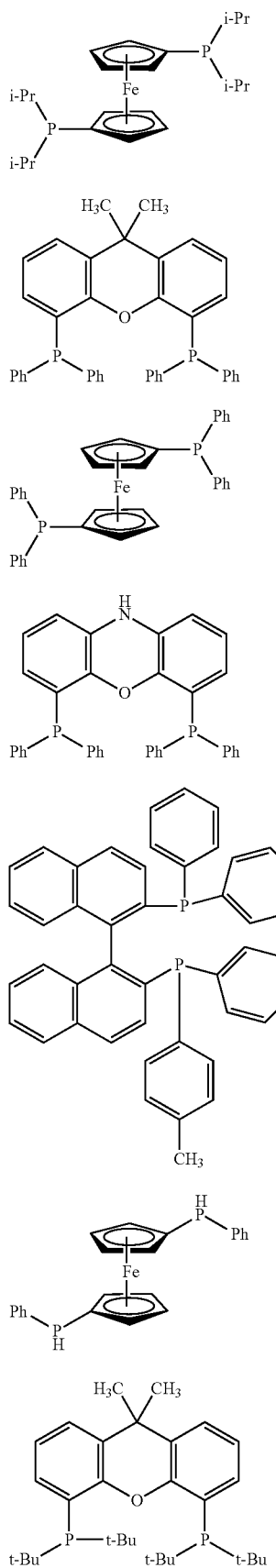

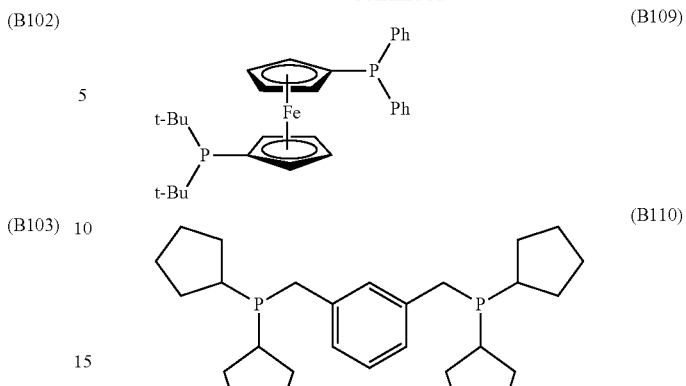

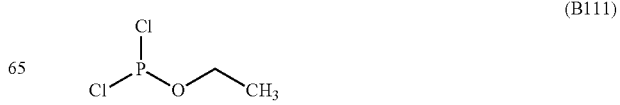

Among these phosphine compounds, in terms of elution resistance and hot water resistance and cost, bis(diphenylphosphino)methane, bis(diphenylphosphino)ethane, bis(diphenylphosphino)propane, bis(diphenylphosphino)butane, bis(diphenylphosphino)pentane, bis(diphenylphosphino)hexane, bis(diphenylphosphino)pentane, bis(diphenylphosphino)octane, bis(diphenylphosphino)nonane, bis(diphenylphosphino)decane, bis[bis(pentafluorophenyl)phosphino]ethane, bis(diphenylphosphino)ethylene, bis(diphenylphosphino)acetylene, bis[(phenylpropanesulfonic acid)phosphine]butane and salt thereof, ((diphenylphosphino)phenyl)diphenylphosphine, bis(dimethylphosphino)methane, bis(dimethylphosphino)ethane, bis(diethylphosphino)ethane, bis(dicyclohexylphosphino)methane, bis(dicyclohexylphosphino)ethane, bis(dicyclohexylphosphino)propane, bis(dicyclohexylphosphino)butane, bis(diphenylphosphino)benzene, bis(diphenylphosphinophenyl)ether, bis(diphenylphosphino)benzophenone, BINAP, bis(diphenylphosphinomethyl)benzene, bis(dicyclohexylphosphinophenyl)ether, bis(dicyclohexylphosphino)benzophenone, phenylenebiphosphine and tetraphenylbiphosphine are more preferable, bis(diphenylphosphino)ethane, bis(diphenylphosphino)propane, bis(diphenylphosphino)butane, bis[bis(pentafluorophenyl)phosphino]ethane, bis[(phenylpropane sulfonic acid)phosphine]butane and salts thereof, ((diphenylphosphino)phenyl)diphenylphosphine, bis(dicyclohexylphosphino)ethane, bis(dicyclohexylphosphino)propane, bis(dicyclohexylphosphino)butane, bis(diphenylphosphino)benzene and BINAP are further preferable, and bis(diphenylphosphino)ethane, bis(diphenylphosphino)propane, bis(diphenylphosphino)butane, bis(diphenylphosphino)benzene and BINAP are most preferable.

Furthermore, examples of the phosphinite compound include methoxydiphenylphosphine, ethoxydiphenylphosphine, butoxydiphenylphosphine, compounds represented by formulae (B111) and (B112), and the like. In addition, examples of the bidentate phosphinite compound include 3,5-bis[(diphenylphosphino)oxy]ethylbenzoate and the like.

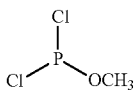
(B112)

Nitrogen-Containing Aromatic Additive (C)

Next, the nitrogen-containing aromatic additive (C) will be described.

The nitrogen-containing aromatic additive (C) is a nitrogen-containing aromatic compound represented by general formula (C1) or (C2).

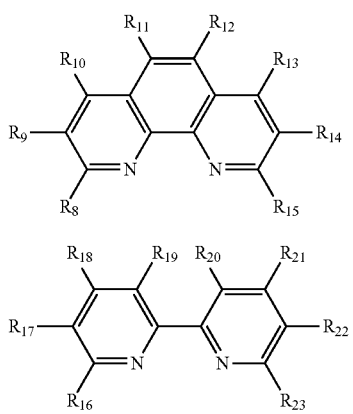

where, in general formulae (C1) and (C2), $R_8$ to $R_{23}$ each independently represent a substituent selected from hydrocarbon groups having a straight chain, a cyclic, or a branched structure, represented by general formula $C_mH_n$ (m and n are an integer number), alkoxy groups having a straight chain, a cyclic, or a branched structure, represented by general formula $OC_mH_n$ (m and n are an integer number), halogen atoms, a hydrogen atom, carboxyl groups, carboxylate groups, sulfonic acid groups, sulfate groups, hydroxyl groups, amino groups, cyano groups and nitro groups; and m and n are independent in each formula.

In the nitrogen-containing aromatic additives (C1) and (C2), $R_8$ to $R_{23}$ are preferably a hydrocarbon group having a straight chain, a cyclic, or a branched structure, represented by general formula $C_mH_n$ (m and n are an integer number), an alkoxy group having a straight chain, a cyclic, or a branched structure, represented by general formula $OC_mH_n$ (m and n are an integer number), a halogen atom, a hydrogen atom, an amino group, a cyano group, a nitro group, a sulfate group or a carboxylate group, in terms of elution resistance, and are more preferably a hydrocarbon group having a straight chain, a cyclic, or a branched structure, represented by general formula $C_mH_n$ (m and n are an integer number), an alkoxy group having a straight chain, a cyclic, or a branched structure, represented by general formula $OC_mH_n$ (m and n are an integer number), a hydrogen atom, an amino group, a cyano group or a nitro group, from the viewpoint of chemical stability. Also, in terms of suppression of bleed out, at least one of $R_8$ to $R_{15}$ and $R_{16}$ to $R_{23}$ is further preferably an amino group. The amino group represents a primary to tertiary amino groups, or a quaternary ammonium cation.

As the nitrogen-containing aromatic additive (C), a compound represented by general formula (C1) is more preferable, in terms of coordination ability to a metal. As compared to the compound represented by general formula (C2), in the compound represented by general formula (C1), two nitrogen-containing aromatic rings are condensed, and an aromatic ring containing N atom having metal coordinating ability is fixed to show higher metal coordinating ability as a kind of a chelate effect. On the other hand, we believe that the compound represented by general formula (C2) is slightly inferior in metal coordinating ability since two nitrogen-containing aromatic rings are freely rotatable. Also, since the condensed two nitrogen-containing aromatic rings in general formula (C1) cannot freely rotate and there is no stereoscopic twist between two aromatic rings as described above, we believe that there is an electronic interaction due to resonance effect in the two aromatic rings. Whereby, reducibility of the nitrogen-containing aromatic compound represented by general formula (C1) is improved, and we believe that the oxidant of the nitrogen-containing aromatic compound produced by reacting with a peroxide and a radical is more easily reduced by the phosphorus-containing additive described above, and is likely to return to the original nitrogen-containing aromatic compound.

The nitrogen-containing aromatic additive (C) is more preferably at least one kind selected from general formulae (C3) to (C13) in terms of cost, further preferably at least one kind selected from general formulae (C4) to (C13) in terms of coordination ability to a metal, and most preferably at least one kind selected from general formulae (C4) to (C6) and (C8) to (C10).

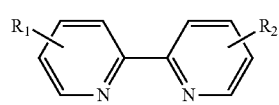
(C3)

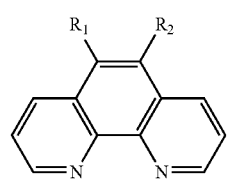
(C4)

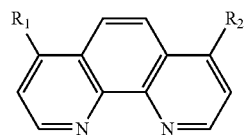
(C5)

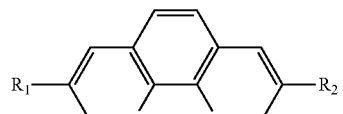
(C6)

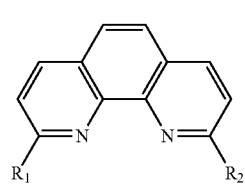
(C7)

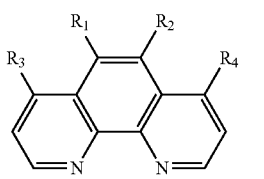
(C8)

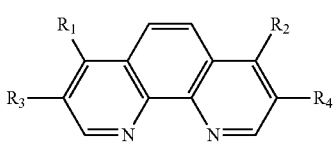
(C9)

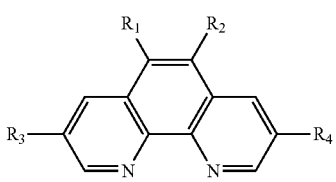
(C10)

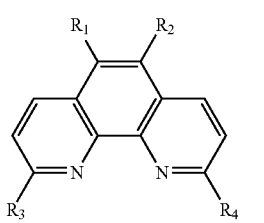
(C11)

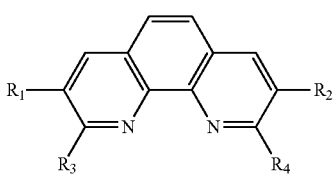
(C12)

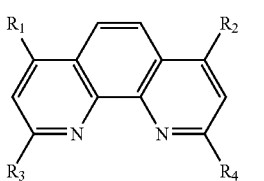
(C13)

where, in general formulae (C3) to (C13), $R_1$ to $R_4$ each independently represent a substituent selected from hydrocarbon groups having a straight chain, a cyclic, or a branched structure, represented by general formula $C_mH_n$ (m and n are an integer number), alkoxy groups having a straight chain, a cyclic, or a branched structure, represented by general formula $OC_mH_n$ (m and n are an integer number), halogen atoms, a hydrogen atom, carboxyl groups, carboxylate groups, sulfonic acid groups, sulfate groups, hydroxyl groups, amino groups, cyano groups and nitro groups, and at least one of $R_1$ and $R_2$ in general formulae (C3) to (C7), and at least one of $R_1$ to $R_4$ in general formulae (C8) to (C13) are an amino group.

Also, as the nitrogen-containing aromatic additive (C), for example, those having a salt structure, like phenanthroline hydrochloride, bipyridine p-toluenesulfonate and the like, can be also preferably used.

The contents of the phosphorus-containing additive (B) and the nitrogen-containing aromatic additive (C) can be adequately selected in consideration of the balance between power generation characteristics and durability, and are not limited. However, the total addition amount of the additives is preferably 0.01% by weight or larger and 15% by weight or smaller, more preferably 0.05% by weight or larger and 3% by weight or smaller, and further preferably 0.1% by weight or larger and 2% by weight or smaller, in the polymer electrolyte composition. When the total addition amount is smaller than 0.01% by weight, the durability becomes insufficient in some cases. In addition, when the total addition amount exceeds 15% by weight, the proton conductivity becomes insufficient in some cases.

Also, in the polymer electrolyte membrane in which the membrane of the polymer electrolyte composition is formed, the total addition amount of the additives is preferably 0.02% by weight or larger and 35% by weight or smaller, more preferably 0.1% by weight or larger and 5% by weight or smaller, and further preferably 0.5% by weight or larger and 3% by weight or smaller. When the total addition amount is smaller than 0.02% by weight, the durability becomes insufficient in some cases. In addition, when the total addition amount exceeds 35% by weight, the proton conductivity becomes insufficient in some cases.

Transition Metal

It is also preferable that the polymer electrolyte composition further contains at least one transition metal selected from the group consisting of Ce, Mn, Ti, Zr, V, Cr, Mo, W, Ru, Co, Rh, Ir, Ni, Pd, Pt, Ag, and Au. As these transition metals, there can be used one or more selected from the group consisting of these transition metals, ions of these transition metals, salts containing these transition metal ions, and oxides of these transition metals.

Among them, from the viewpoint of high functions as the radical scavenger and the peroxide decomposer, preferable ones are Ce, Mn, V, Mo, W, Ru, Co, Rh, Ir, Ni, Pd, Pt, Ag, and Au, more preferable ones are Ce, Mn, Ru, Co, Rh, Ir, Ni, Pd, Pt, Ag, and Au, further preferable ones are Ru, Co, Rh, Ir, Ni, Pd, Pt, Ag, and Au, and most preferable ones are Pt, Ru, Co, Rh, Ir, Ni, Pd, and Au.

The content of the transition metal can be adequately selected in consideration of the balance between the power generation characteristics and the durability, and is not limited. However, the content thereof is preferably 0.01% by weight or larger and 15% by weight or smaller relative to the entire polymer electrolyte composition, further preferably 0.05% by weight or larger and 3% by weight or smaller, and most preferably 0.1% by weight or larger and 2% by weight or smaller.

Also, in the polymer electrolyte membrane in which the membrane of the polymer electrolyte composition is formed, the content of the transition metal is preferably 0.02% by weight or larger and 35% by weight or smaller, more preferably 0.1% by weight or larger and 5% by weight or smaller, and further preferably 0.5% by weight or larger and 3% by weight or smaller.

When the transition metal is a salt or oxide containing a transition metal, the content of the transition metal is defined as a content equivalent to the transition metal in the compound (only transition metal part).

Furthermore, the content ratio of the phosphorus-containing additive (B), the nitrogen-containing aromatic additive (C) and the transition metal can also be adequately selected in consideration of the balance between the power generation characteristics and the durability, and is not limited. However, the molar ratio of phosphorus to transition metal and the molar ratio of nitrogen to transition metal in the aromatic ring are preferably 0.01 or larger and 100 or smaller. The molar ratio of phosphorus to transition metal and the molar ratio of nitrogen to transition metal in the aromatic ring are more preferably 20 or smaller, and further preferably 10 or smaller.

Examples of salt that contains a transition metal ion include a salt containing a positive trivalent cerium ion, a salt containing a positive tetravalent cerium ion, a salt containing a positive divalent manganese ion, and a salt containing a positive trivalent manganese. The salt containing a positive trivalent cerium ion includes cerium acetate, cerium chloride, cerium nitrate, cerium carbonate, cerium sulfate and the like. The salt containing positive tetravalent cerium ion includes cerium sulfate, ammonium cerium(IV) sulfate and the like. The salt containing a positive divalent manganese ion includes manganese acetate, manganese chloride, manganese nitrate, manganese carbonate, manganese sulfate and the like. The salt containing a positive trivalent manganese includes manganese acetate and the like. Among them, the use of cerium nitrate and manganese nitrate is preferred because of the high suppression effect of the oxidation deterioration.

The transition metal ions may exist alone or can exist as a complex coordinating with an organic compound. Among them, the complex of the phosphorus-containing compound (B) and the nitrogen-containing aromatic compound (C) is preferable from the viewpoint that elution of the additive during operation of fuel cell and ion cross-linking and gelation of the polymer electrolyte composition are suppressed (excellent in gel resistance) and, moreover, it is further preferable when the phosphorus-containing additive (B) is a bidentate compound represented by general formula (B1) and the nitrogen-containing aromatic additive (C) is a phenanthroline compound represented by general formula (C1) since a complex more excellent in elution resistance and gel resistance can be formed. Furthermore, it is most preferable when the phosphorus-containing compound (B1) is a bidentate phosphine compound or a bidentate phosphinite compound since a complex further excellent in elution resistance and gel resistance can be formed.

In addition, examples of the oxide of transition metal include cerium oxide, manganese oxide, ruthenium oxide, cobalt oxide, nickel oxide, chromium oxide, iridium oxide, and lead oxide. Among them, cerium oxide and manganese oxide are preferred because of the high effect of suppressing the oxidation deterioration.

Ionic Group-Containing Polymer (A)

Next, the ionic group-containing polymer (A) will be described.

The ionic group-containing polymer (A) may be any of the perfluoro-based polymer and the hydrocarbon-based polymer as long as the polymer can satisfy both power generation characteristics and chemical stability.

The perfluoro-based polymer means the polymer in which most or all the hydrogen atoms of the alkyl group and/or the alkylene group in the polymer are substituted with fluorine atoms. Typical examples of the perfluoro-based polymer containing an ionic group can include commercial products such as Nafion (registered trademark, manufactured by DuPont), Flemion (registered trademark, manufactured by Asahi Glass Co. Ltd.), and Aciplex (registered trademark, manufactured by Asahi Kasei Corporation).

These perfluoro-based polymers are very expensive and have a problem of large gas cross-over. Also, from the viewpoint of mechanical strength, physical durability, chemical stability, and the like, the ionic group-containing polymer (A) is preferably a hydrocarbon-based polymer, and more preferably a hydrocarbon-based polymer having an aromatic ring in the main chain. The aromatic ring may include not only a hydrocarbon-based aromatic ring, but also a hetero ring and the like. Furthermore, together with the aromatic ring unit, an aliphatic-based unit may structure the polymer as a part thereof.

Specific examples of the hydrocarbon-based polymer having an aromatic ring in the main chain include polymers such as polysulfone, polyethersulfone, polyphenylene oxide, polyarylene ether-based polymer, polyphenylene sulfide, polyphenylenesulfidesulfone, polyparaphenylene, polyarylene-based polymer, polyarylene ketone, polyetherketone, polyarylenephosphine oxide, polyetherphosphine oxide, polybenzoxazole, polybenzthiazole, polybenzimidazole, aromatic polyamide, polyimide, polyetherimide, and polyimidesulfone.

Among them, from the viewpoint of mechanical strength, physical durability, and manufacturing cost, aromatic polyether-based polymers are further preferable. Further, aromatic polyetherketone-based polymers are specifically preferable from the viewpoint of exhibiting crystallinity caused by good packing of main chain skeleton structure and by extremely strong intermolecular aggregation force, and having a property of completely insoluble in general solvents, and from the viewpoint of excellent tensile strength and elongation, tear strength, and fatigue resistance. The aromatic polyetherketone-based polymer referred to herein is a general name of polymers having at least an aromatic ring, an ether bond and a ketone bond in the main chain, and includes aromatic polyetherketone, aromatic polyetherketoneketone, aromatic polyetheretherketone, aromatic polyetheretherketoneketone, aromatic polyetherketoneetherketoneketone, aromatic polyetherketonesulfone, aromatic polyetherketonephosphine oxide, aromatic polyetherketone nitrile and the like.

The ionic group of the ionic group-containing polymer (A) is preferably an atomic group having a negative charge, and preferably the one having proton-exchange capability. That type of functional group preferably includes sulfonic acid group, sulfonimide group, sulfuric acid group, phosphonic acid group, phosphoric acid group, and carboxylic acid group. Also, the ionic group includes the ones in which the group becomes the respective salts. The cations forming these salts can include arbitrary metal cations, $NR_4^+$ (R is an arbitrary organic group) and the like. The metal cation can be used without specifically limiting the number of valence, and the like. Specific examples of preferable metal cation include cations such as Li, Na, K, Rh, Mg, Ca, Sr, Ti, Al, Fe, Pt, Rh, Ru, Ti, and Pd. Among them, cations of Na, K, and Li which are inexpensive and easily capable of proton substitution are preferably used. Among them, at least sulfonic acid group, sulfone imide group or sulfuric acid group is more preferably contained from the viewpoint of high proton conductivity, at least sulfonic acid group is most preferably contained from the viewpoint of raw material cost.

Applicable method of introducing an ionic group includes: a method of performing polymerization by using a monomer having an ionic group; and a method of introducing an ionic group in a polymer reaction.

As the method of performing polymerization by using a monomer having an ionic group, a monomer having an ionic group in the repeating units may be used. Such method is, for example, disclosed in Journal of Membrane Science, 197, 2002, p. 231-242. The method is easy in controlling the ion-exchange capacity of the polymer, and thus is preferred.

The method of introducing an ionic group by polymer reaction can be done by, for example, the method described in Polymer Preprints, Japan, 51, 2002, p. 750 and the like.

Introduction of a phosphoric acid group into a hydrocarbon-based polymer having an aromatic ring in the main chain can be done by, for example, phosphoric acid esterification of a polymer having a hydroxyl group. Introduction of a carboxylic acid group can be done by, for example, oxidation of a polymer having an alkyl group or a hydroxy alkyl group. Introduction of a sulfuric acid group can be done by, for example, sulfuric acid esterification of a polymer having a hydroxyl group. For the introduction of a sulfonic acid group into a hydrocarbon-based polymer having an aromatic ring in the main chain, for example, the method described in Japanese Patent Laid-Open No. 02-16126, Japanese Patent Laid-Open No. 02-208322 or the like can be used. Specifically, for example, sulfonation can be performed by causing a hydrocarbon-based polymer having an aromatic ring in the main chain to react with a sulfonation agent such as chlorosulfonic acid in a solvent such as chloroform, or by causing a hydrocarbon-based polymer to react in concentrated sulfuric acid or oleum. The sulfonation agent is not specifically limited as long as the agent can sulfonate the polymer, and other than the above, sulfur trioxide and the like can be used. In sulfonating a hydrocarbon-based polymer having an aromatic ring in the main chain by the above method, the degree of sulfonation can be controlled by the use amount of the sulfonation agent, the reaction temperature, and the reaction time. Introduction of a sulfone imide group into a hydrocarbon-based polymer having an aromatic ring in the main chain can be done by, for example, a method of causing a sulfonic acid group to react with a sulfone amide group.

The molecular weight of thus obtained ionic group-containing polymer (A) is, as the weight-average molecular weight in terms of polystyrene, preferably in a range of 1,000 to 5000,000, more preferably 10,000 to 500,000. When the molecular weight is smaller than 1,000, any of the mechanical strength including cracking, the physical durability, and the solvent resistance, of the molded membrane may be insufficient. On the other hand, when the molecular weight exceeds 5000,000, solubility is insufficient, and solution viscosity is high, thereby resulting in poor processability in some cases.

From the viewpoint of proton conductivity under low-humidification conditions and power generation characteristics, the ionic group-containing polymer (A) is more preferably a block polymer containing a segment (A1) containing an ionic group and a segment (A2) not containing an ionic group. It is herein described as "segment (A2) not containing an ionic group" for convenience, but the segment (A2) does not exclude that an ionic group is contained in a small amount within a range of affecting no decisive adverse effect on the performance as an electrolyte membrane. Also, a block polymer having a linker moiety connecting the segments is further preferable. The presence of a linker can connect different segments while effectively suppressing side reactions.

The number-average molecular weights of the segment (A1) containing an ionic group and the segment (A2) not containing an ionic group are related to the domain size of the phase-separated structure, and from the viewpoint of balance between the proton conductivity and the physical durability under low-humidification conditions, they are each more preferably 5,000 or larger, further preferably 10,000 or larger, and most preferably 15,000 or larger. In addition, the number-average molecular weights are each more preferably 50,000 or smaller, further preferably 40,000 or smaller, and most preferably 30,000 or smaller.

As that type of block polymer (A), one in which the segment (A1) containing an ionic group contains a constituent unit represented by general formula (S1) and the segment (A2) not containing an ionic group contains a constituent unit represented by general formula (S2) is further preferable.

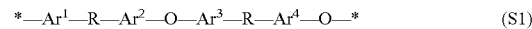

$$*-Ar^1-R-Ar^2-O-Ar^3-R-Ar^4-O-* \quad (S1)$$

where, in general formula (S1), $Ar^1$ to $Ar^4$ each represent an arbitrary divalent arylene group; at least one of $Ar^1$ and $Ar^2$ has an ionic group as a substituent; $Ar^3$ and $Ar^4$ may or may not contain an ionic group as a substituent; $Ar^1$ to $Ar^4$ may each be arbitrarily substituted with a group other than an ionic group; $Ar^1$ to $Ar^4$ may be the same or different for every constituent unit; R represents a ketone group or a protective group that may be induced to a ketone group, and each may be the same or different; and the symbol * signifies a bond moiety with general formula (S1) or with other constituent unit.

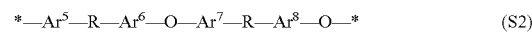

$$*-Ar^5-R-Ar^6-O-Ar^7-R-Ar^8-O-* \quad (S2)$$

where, in general formula (S2), $Ar^5$ to $Ar^8$ each represent an arbitrary divalent arylene group, may be arbitrarily substituted, and have no ionic group; $Ar^5$ to $Ar^8$ may be the same or different for every constituent unit; R represents a ketone group or a protective group that may be induced to a ketone group, and each may be the same or different; and the symbol * signifies a bond moiety with general formula (S2) or with other constituent unit.

Specific examples of the protective group that may be induced to a ketone group are the ones commonly used in organic synthesis, and the protective group represents a substituent which is temporarily introduced on the premise of being removed in the subsequent step and can return to the original ketone group by deprotection.

Such protective groups are, for example, described in detail in Theodora W. Greene, "Protective Groups in Organic Synthesis," U.S., John Wiley & Sons, Inc. 1981, and they can be preferably used. The reactions can be appropriately selected in consideration of reactivity and yield of protection reaction and deprotection reaction, stability in a state of containing the protective group, manufacturing cost, and the like. Among them, particularly, the method of protection/deprotection of ketone moiety at the ketal moiety; and the method of protection/deprotection of ketone moiety by a hetero atom-analog such as thioketal at the ketal moiety are preferably used.

More preferable constituent unit containing a protective group includes the one containing at least one selected from general formulae (U1) and (U2).

where, in formulae (U1) and (U2), $Ar_9$ to $Ar_{12}$ are each an arbitrary divalent arylene group; $R_1$ and $R_2$ are each at least one kind of group selected from H and alkyl groups; $R_3$ is an arbitrary alkylene group; E is O or S, each may represent two or more kinds of groups; and the groups represented by formulae (U1) and (U2) may be arbitrarily substituted.

Among them, from the viewpoint of odor, reactivity, stability and the like of the compound, the most preferable is that E is O in general formulae (U1) and (U2), that is, the method of protection/deprotection of ketone moiety at the ketal moiety is the most preferable.

In general formula (U1), from the viewpoint of stability, $R_1$ and $R_2$ are more preferably an alkyl group, further preferably an alkyl group having 1 to 6 carbons, and most preferably an alkyl group having 1 to 3 carbons. In addition, in general formula (U2), from the viewpoint of stability, $R_3$ is more preferably an alkylene group having 1 to 7 carbons, and most preferably an alkylene group having 1 to 4 carbons. Specific examples of $R_3$ include —$CH_2CH_2$—, —$CH(CH_3)CH_2$—, —$CH(CH_3)CH(CH_3)$—, —$C(CH_3)_2CH_2$—, —$C(CH_3)_2CH(CH_3)$—, —$C(CH_3)_2O(CH_3)_2$—, —$CH_2CH_2CH_2$—, —$CH_2C(CH_3)_2CH_2$— and the like, and $R_3$ is not limited to these examples.

Among the constituent units represented by general formulae (U1) and (U2), from the viewpoint of stability such as hydrolysis resistance, one having at least general formula (U2) is more preferably used. Furthermore, in general formula (U2), $R_3$ is preferably an alkylene group having 1 to 7 carbons, that is, a group represented by $C_{n1}H_{zn1}$ ($_{n1}$ is an integer of 1 to 7), and the most preferable ones are at least one selected from —$CH_2CH_2$—, —$CH(CH_3)CH_2$—, and —$CH_2CH_2CH_2$—, from the viewpoint of stability and ease of synthesis.

The deprotection reaction can be performed in the presence of water and acid under a homogeneous or heterogeneous condition, but from the viewpoint of mechanical strength, physical durability, and solvent resistance, the method of performing acid treatment after molding into membrane or the like is more preferable. Specifically, it is possible to deprotect the molded membrane by immersing it in an aqueous solution of hydrochloric acid or an aqueous solution of sulfuric acid. The concentration of acid and the temperature of aqueous solution can be adequately selected.

The block polymer containing the constituent units represented by general formulae (S1) and (S2) chemically stabilizes all the arylene groups by the electron-withdrawing ketone group when used as the electrolyte membrane through deprotection, and further improves the physical durability through toughening by giving crystallinity and through softening by lowering the glass transition temperature.

In general formulae (S1) and (S2), $Ar^1$ to $Ar^8$ include: hydrocarbon-based arylene groups such as phenylene group, naphthylene group, biphenylene group, and fluorene diyl group; and heteroarylene groups such as pyridine diyl, quinoxaline diyl, and thiophene diyl. Preferable group is phenylene group, and most preferable group is p-phenylene group.

As the segment (A1) containing an ionic group, a constituent unit which is chemically stable, increases the acidity because of the electron-withdrawing effect and introduces an ionic group at high density is more preferable. Also, as the segment (A2) not containing an ionic group, a constituent unit that is chemically stable and exhibits crystallinity by strong intermolecular cohesive force is more preferable.

The content of the constituent unit represented by general formula (S1) which is included in the segment (A1) containing an ionic group is more preferably 20 mol % or larger, further preferably 50 mol % or larger, and most preferably 80 mol % or larger. Also, the content of the constituent unit represented by general formula (S2) which is included in the segment (A2) not containing an ionic group is more preferably 20 mol % or larger, further preferably 50 mol % or larger, and most preferably 80 mol % or larger. When the content of the constituent unit represented by general formula (S2) which is included in the segment (A2) not containing an ionic group is smaller than 20 mol %, the desired effect in terms of mechanical strength, dimensional stability and physical durability, due to crystallinity, when used as the electrolyte membrane through deprotection, tends to be insufficient.

Specific examples of more preferable constituent unit represented by general formula (S1) include the constituent unit represented by general formula (P2), from the viewpoint of availability of raw material. Among them, from the viewpoint of availability of raw material and polymerizability, the constituent unit represented by formula (P3) is more preferable, and the constituent unit represented by formula (P4) is most preferable.

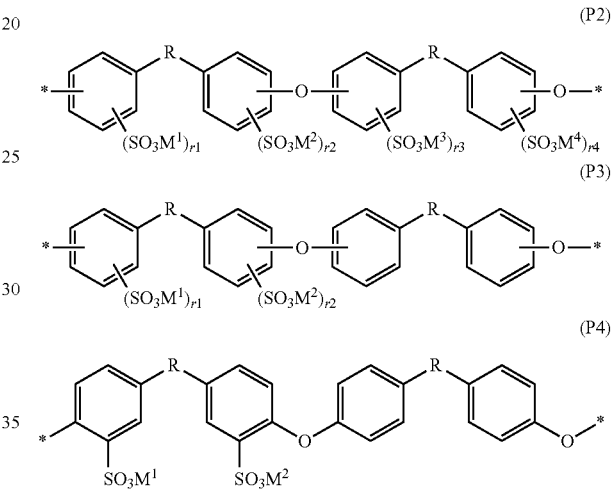

where, in formulae (P2), (P3), and (P4), $M^1$ to $M^4$ each may represent hydrogen, a metal cation, and an ammonium cation $NR_4^+$ (R is an arbitrary organic group); $M^1$ to $M^4$ may represent two or more kinds of groups; r1 to r4 are each independently an integer of 0 to 2; r1+r2 signifies an integer of 1 to 8; r1 to r4 may be different for every constituent unit; R represents a ketone group or a protective group that may be induced to a ketone group, and each may be the same or different; and the symbol * signifies a bond moiety with formulae (P2), (P3), and (P4), or with other constituent unit.

As the block polymer, the molar composition ratio of the segment (A1) containing an ionic group to the segment (A2) not containing an ionic group, (A1/A2), is more preferably 0.2 or larger, further preferably 0.33 or larger, and most preferably 0.5 or larger. In addition, the molar composition ratio (A1/A2) is more preferably 5 or smaller, further preferably 3 or smaller, and most preferably 2 or smaller. When the molar composition ratio (A1/A2) is smaller than 0.2 or exceeds 5, the proton conductivity under low-humidification conditions tends to be insufficient, and the hot water resistance and the physical durability tend to be insufficient.

From the viewpoint of proton conductivity under low-humidification conditions, the ion-exchange capacity of the segment (A1) containing an ionic group is preferably 2.5 meq/g or larger, more preferably 3 meq/g or larger, and further preferably 3.5 meq/g or larger. In addition, the ion-exchange capacity thereof is preferably 6.5 meq/g or smaller, more preferably 5 meq/g or smaller, and further preferably 4.5 meq/g or smaller, from the viewpoint of hot water resistance and physical durability.

The ion-exchange capacity of the segment (A2) not containing an ionic group is preferably low values, from the viewpoint of hot water resistance, mechanical strength, dimensional stability, and physical durability, and is preferably 1 meq/g or smaller, more preferably 0.5 meq/g or smaller, and further preferably 0.1 meq/g or smaller.

When the block polymer has a sulfonic acid group, the ion-exchange capacity thereof is preferably 0.1 to 5 meq/g, more preferably 1.5 meq/g or larger, and further preferably 2 meq/g or larger, from the viewpoint of balance between the proton conductivity and the water resistance. The ion-exchange capacity is more preferably 3.5 meq/g or smaller, and further preferably 3 meq/g or smaller. When the ion-exchange capacity is smaller than 0.1 meq/g, the proton conductivity becomes insufficient in some cases. When the ion-exchange capacity is larger than 5 meq/g, the water resistance becomes insufficient in some cases.

The ion-exchange capacity is defined as the value obtained by the neutralization titration. The neutralization titration is performed as follows. The measurements are performed three or more times, and the average of them is taken.

(1) An electrolyte membrane is proton-substituted, and fully rinsed with pure water. After wiping off the water on the surface of the electrolyte membrane, the membrane is vacuum-dried at 100° C. for 12 hours or more, and the dry weight is obtained.
(2) 50 mL of an aqueous solution of 5% by weight of sodium sulfate is added to the electrolyte, and the resultant solution is allowed to stand for 12 hours for conducting ion-exchange.
(3) The generated sulfuric acid is titrated using an aqueous solution of 0.01 mol/L sodium hydroxide. A commercially available 0.1 w/v % phenolphthalein solution for titration is added as the indicator. A point where the color turns light purplish red is defined as the end point.
(4) The ion-exchange capacity is obtained from the following formula:

Ion-exchange capacity (meq/g)=[Concentration of aqueous solution of sodium hydroxide (mmol/mL)×Titrated amount (mL)]/Dry weight of sample (g).

The method of synthesizing an oligomer constituting the segment (A1) containing an ionic group and the segment (A2) not containing an ionic group is not specifically limited if only the method is a method in which substantially sufficient molecular weight is obtained. For example, the synthesis can be done through the utilization of: an aromatic nucleophilic substitution reaction of an aromatic active dihalide compound and a divalent phenol compound; or an aromatic nucleophilic substitution reaction of a halogenated aromatic phenol compound.

As an aromatic active dihalide compound used for the synthesis of an oligomer constituting the segment (A1) containing an ionic group, the use as a monomer of a compound in which an ionic group is introduced into an aromatic active dihalide compound is preferred from the viewpoint of chemical stability, manufacturing cost, and availability of precise control of the amount of ionic group. Preferred specific examples of the monomer having a sulfonic acid group as the ionic group can include, 3,3'-disulfonate-4,4'-dichlorodiphenylsulfone, 3,3'-disulfonate-4,4'-difluorodiphenylsulfone, 3,3'-disulfonate-4,4'-dichlorodiphenylketone, 3,3'-disulfonate-4,4'-difluorodiphenylketone, 3,3'-disulfonate-4,4'-dichlorodiphenylphenylphosphine oxide, 3,3'-disulfonate-4,4'-difluorodiphenylphenylphosphine oxide, and the like. Among them, from the viewpoint of chemical stability and physical durability, more preferable ones are 3,3'-disulfonate-4,4'-dichlorodiphenylketone and 3,3'-disulfonate-4,4'-difluorodiphenylketone, and from the viewpoint of polymerization activity, the most preferable one is 3,3'-disulfonate-4,4'-difluorodiphenylketone.

Also, examples of the aromatic active dihalide compound having no ionic group used for the synthesis of an oligomer constituting the segment (A1) containing an ionic group and an oligomer constituting the segment (A2) not containing an ionic group can include 4,4'-dichlorodiphenyl sulfone, 4,4'-difluorodiphenyl sulfone, 4,4'-dichlorodiphenyl ketone, 4,4'-difluorodiphenyl ketone, 4,4'-dichlorodiphenylphenylphosphine oxide, 4,4'-difluorodiphenylphenylphosphine oxide, 2,6-dichlorobenzonitrile, 2,6-difluorobenzonitrile, and the like. Among them, 4,4'-dichlorodiphenyl ketone and 4,4'-difluorodiphenyl ketone are more preferable from the viewpoint of providing crystallinity, mechanical strength, physical durability and hot water resistance, and 4,4'-difluorodiphenyl ketone is the most preferable from the viewpoint of polymerization activity. These aromatic active dihalide compounds can be used alone, and can also be used together with a plurality of aromatic active dihalide compounds.

Also, examples of a monomer not containing an ionic group used for the synthesis of an oligomer constituting the segment (A1) containing an ionic group and an oligomer constituting the segment (A2) containing no ionic group can include halogenated aromatic hydroxy compounds. The compound can synthesize a segment by copolymerizing with the aromatic active dihalide compound described above. Although the halogenated aromatic hydroxy compound is not specifically limited, there are included, as examples, 4-hydroxy-4'-chlorobenzophenone, 4-hydroxy-4'-fluorobenzophenone, 4-hydroxy-4'-chlorodiphenyl sulfone, 4-hydroxy-4'-fluorodiphenylsulfone, 4-(4'-hydroxybiphenyl)(4-chlorophenyl)sulfone, 4-(4'-hydroxybiphenyl)(4-fluorophenyl)sulfone, 4-(4'-hydroxybiphenyl)(4-chlorophenyl)ketone, 4-(4'-hydroxybiphenyl)(4-fluorophenyl)ketone, and the like. They can be used alone, and can be used as a mixture of two or more thereof. Furthermore, an aromatic polyether-based compound may be synthesized by causing these halogenated aromatic hydroxy compounds to react in the reaction between an activated dihalogenated aromatic compound and an aromatic dihydroxy compound.

The synthesis method for the block polymer is not specifically limited only if the method is a method in which substantially sufficient molecular weight is obtained. For example, the synthesis can be done through the utilization of: an aromatic nucleophilic substitution reaction of an oligomer constituting the segment containing an ionic group and an oligomer constituting the segment not containing an ionic group.

In the aromatic nucleophilic substitution reaction being conducted to obtain the oligomer constituting the segment of the block polymer or the block polymer from the oligomer, the above monomer mixture or segment mixture is reacted in the presence of a basic compound. The polymerization can be performed at temperatures of 0 to 350° C., and temperatures of 50 to 250° C. are preferred. When the temperature is lower than 0° C., the reaction tends not to proceed sufficiently, and when the temperature is higher than 350° C., the polymer decomposition tends to start occurring.

Although the polymerization reaction can be done without a solvent, it is preferable to conduct the reaction in a solvent.

Applicable solvents include non-protonic polar solvents such as N,N-dimethylacetamide, N,N-dimethylformamide, N-methyl-2-pyrrolidone, dimethylsulfoxide, sulfolane, 1,3-dimethyl-2-imidazolidinone and hexamethylphosphone triamide, and the like, but are not limited to these solvents, and any solvent can be applied only if the solvent can be used as a stable one in the aromatic nucleophilic substitution reaction. These organic solvents can be used alone or as a mixture of two or more thereof.

Examples of the basic compounds used in the aromatic nucleophilic substitution reaction include sodium hydroxide, potassium hydroxide, sodium carbonate, potassium carbonate, sodium hydrogen carbonate, and potassium hydrogen carbonate, but are not limited to these compounds, and any basic compound can be used as long as the compound can change the aromatic diols into the active phenoxide structure. In addition, to increase the nucleophilicity of the phenoxide, the addition of a crown ether such as 18-crown-6 is preferable. These crown ethers, in some cases, coordinate with sodium ions and potassium ions in the sulfonic acid group, to thereby improve the solubility to an organic solvent, and can be favorably used.

In the aromatic nucleophilic substitution reaction, water is generated as a by-product, in some cases. At this time, independent of the polymerization solvent, toluene or the like can be caused to coexist in the reaction system to remove the water from the system as an azeotrope. As the method of removing water from the reaction system, water-absorbent such as molecular sieve can be used.

The azeotropic agent to be used to remove reaction water or water introduced during the reaction is normally an arbitrary inactive compound which does not substantially interfere with the polymerization, that carries out co-distillation with water, and boils at temperatures of about 25° C. to about 250° C. The normal azeotropic agent includes benzene, toluene, xylene, chlorobenzene, methylene chloride, dichlorobenzene, trichlorobenzene, cyclohexane and the like. Naturally, it is useful to select an azeotropic agent having lower boiling point than the boiling point of the bipolar solvent to be used. Although an azeotropic agent is normally used, the use of the azeotropic agent is not always required when the high reaction temperature, for example, 200° C. or higher is used, specifically when an inert gas is continuously sprayed onto the reaction mixture. Normally, the reaction is desirably conducted in a state where no oxygen exists in an inert atmosphere.

When the aromatic nucleophilic substitution reaction is conducted in a solvent, it is preferred to charge the monomer so that the concentration of polymer to be obtained is 5 to 50% by weight. When the concentration of polymer to be obtained is smaller than 5% by weight, the degree of polymerization tends not to increase. On the other hand, when the concentration is larger than 50% by weight, the viscosity of reaction system becomes excessively high, which tends to result in difficulty in post-treatment of the reaction products.

After completion of the polymerization reaction, the solvent is removed by vaporization from the reaction solution, and the desired polymer is obtained after rinsing the residue, as necessary. In addition, it is also possible to obtain the polymer by the processes of: adding the reaction solution to a solvent which has low polymer solubility and high solubility of by-product inorganic salt, to thereby remove the inorganic salt and to precipitate the polymer as a solid; and filtering the sediment. The recovered polymer is rinsed with, as appropriate, water, alcohol, or other solvents, followed by being dried. When the desired molecular weight is obtained, the halide or the phenoxide terminal group can be caused to react by introducing a phenoxide or a halide terminal-blocking agent which forms a stable terminal group, in some cases.

When a block polymer is used as the ionic group-containing polymer (A) in the polymer electrolyte composition, the phosphorus-containing additive (B) and the nitrogen-containing aromatic additive (C) can be located concentrating in the hydrophilic domain formed by the segment (A1) containing an ionic group and in the hydrophobic domain formed by the segment (A2) not containing an ionic group, by adequately selecting the polarity (hydrophilic and hydrophobic properties) thereof. We believe that hydroxy radical and hydrogen peroxide usually have high hydrophilicity, and exist in the hydrophilic domain formed by the segment (A) containing an ionic group, thus cutting the segment. Consequently, the hydrophilic additive is effective to stabilize the segment (A1) containing an ionic group. On the other hand, the hydrophobic domain formed by the segment (A2) not containing an ionic group is a component that contributes to the mechanical strength, thus the hydrophobic domain is believed to have an effect of improving physical durability by placing the hydrophobic additive thereto. The combined use of the hydrophilic additive and the hydrophobic additive is also preferable as necessary.

Preferred block polymer used as the ionic group-containing polymer (A) is the one allowing observation of the phase-separation structure by using a TEM at a magnification of 50,000, and giving 5 nm or larger and 500 nm or smaller average interlayer distance or average interparticle distance determined by image-processing. Among them, 10 nm or larger and 50 nm or smaller average interlayer distance or average interparticle distance is more preferable and 15 nm or larger and 30 nm or smaller thereof is further preferable. When the phase separation structure cannot be observed through the transmission electron microscope, or when the average interlayer distance or the average interparticle distance is smaller than 5 nm, the continuity of ion channel is insufficient and conductivity becomes insufficient in some cases. In addition, when the interlayer distance exceeds 500 nm, the mechanical strength and the dimensional stability become poor in some cases.

The block polymer used as the ionic group-containing polymer (A) preferably has crystallinity while keeping the phase-separation structure. More specifically, it is preferred that the block polymer is confirmed to exhibit crystallinity by the differential scanning calorimetry (DSC) or by the wide angle X-ray diffractometry. Specifically, it is preferable to exhibit a crystallization heat of 0.1 J/g or larger measured by the differential scanning calorimetry, or exhibit a degree of crystallinity of 0.5% or larger measured by the wide angle X-ray diffractometry. The term "having crystallinity" means that the polymer can be crystallized when heated, has a crystallizable property, or has already been crystallized. In addition, the term "amorphous polymer" means a polymer that is not a crystalline polymer and does not substantially progress the crystallization. Accordingly, even for a crystalline polymer, when the polymer does not sufficiently progress the crystallization, the polymer is in an amorphous state in some cases.

Method of Adding Additive

The method of adding the phosphorus-containing additive (B) and the nitrogen-containing aromatic additive (C) to the ionic group-containing polymer (A) is not specifically limited, and it is preferred to use any method of (1) to (3) from the viewpoint of superior mass productivity.

(1) A method of dissolving or dispersing the phosphorus-containing additive (B) and the nitrogen-containing aromatic additive (C) in a solution or dispersion of the ionic group-containing polymer (A), and then forming a membrane by using the resultant solution to thereby prepare the polymer electrolyte membrane.
(2) A method of applying the liquid of dissolved phosphorus-containing additive (B) and/or the nitrogen-containing aromatic additive (C) on the polymer electrolyte membrane composed of the ionic group-containing polymer (A).
(3) A method of immersing the polymer electrolyte membrane composed of the ionic group-containing polymer (A) into the liquid of dissolved phosphorus-containing additive (B) and/or the nitrogen-containing aromatic additive (C).

Other

The polymer electrolyte composition is specifically preferred as the polymer electrolyte form article. The term "polymer electrolyte form article" means the formed article containing the polymer electrolyte composition. The polymer electrolyte form article can be in various shapes depending on the uses such as membrane (including film and film-like ones), plate, fiber, hollow fiber, particles, mass, fine pores, coating, and foamed one. Because of the improvement in freedom of polymer design and the improvement in various characteristics such as mechanical characteristics and solvent resistance, they can be applied in wide range of uses. Specifically, when the polymer electrolyte form article is membrane, the use is preferred.

The method of forming the polymer electrolyte composition into a polymer electrolyte membrane is not specifically limited, and there can be used a method of forming a membrane in a solution state or in a molten state. In the former case, there can be exemplified a method of forming a membrane by dissolving the polymer electrolyte material in a solvent such as N-methyl-2-pyrrolidone, and performing flow-casting coating of the solution on a glass plate or the like, followed by removing the solvent.

Applicable solvent used for the membrane-formation is the one that dissolves the polymer electrolyte composition and then allows removing thereof. Examples of the solvents preferably used are: non-protonic polar solvents such as N,N-dimethylacetamide, N,N-dimethylformamide, N-methyl-2-pyrrolidone, dimethylsulfoxide, sulfolane, 1,3-dimethyl-2-imidazolidinone, and hexamethylphosphone triamide; ester-based solvents such as γ-butyrolactone and butylacetate; carbonate-based solvent such as ethylene carbonate and propylene carbonate; alkylene glycol monoalkyl ethers such as ethylene glycol monomethyl ether, ethylene glycol monoethyl ether, propylene glycol monomethyl ether, and propylene glycol monoethyl ether; alcohol-based solvents such as isopropanol; water; and a mixture thereof. Among these, non-protonic polar solvents are preferred because of the highest solubility. In addition, to increase the solubility of the segment (A1) containing an ionic group, the addition of crown ether such as 18-crown-6 is preferred.

To obtain a tough membrane, a preferred method is to subject the polymer solution prepared to give a necessary solid concentration, to normal pressure filtration or positive pressure filtration, and to thereby remove a foreign substance from the polymer electrolyte solution. Although the filter medium used herein is not specifically limited, a glass filter and a metallic filter are preferable. For the filtration, the minimum filter pore size allowing the polymer solution to pass therethrough is preferably 1 µm or smaller.

Next, thus obtained polymer electrolyte membrane is preferably subjected to heat treatment in a state where at least a part of the ionic groups is a metal salt. When the polymer electrolyte material used is polymerized in a metal salt state, it is preferable to form the membrane and to perform the heat treatment in that condition. The metal of the metallic salt is the one capable of forming a salt with the ionic group, and from the viewpoint of price and environmental load, the preferred metal includes Li, Na, K, Rb, Cs, Mg, Ca, Sr, Ba, Ti, V, Mn, Fe, Co, Ni, Cu, Zn, Zr, Mo, and W. Among these, more preferable ones are Li, Na, K, Ca, Sr, and Ba, and further more preferable ones are Li, Na, and K. The heat treatment temperature is preferably 80 to 350° C., more preferably 100 to 200° C., and particularly preferably 120 to 150° C. The heat treatment time is preferably 10 seconds to 12 hours, further preferably 30 seconds to 6 hours, and particularly preferably 1 minute to 1 hour. When the heat treatment temperature is excessively low, the mechanical strength and physical durability become insufficient in some cases. On the other hand, when the heat treatment temperature is excessively high, the chemical decomposition of the membrane material proceeds in some cases. When the heat treatment time is shorter than 10 seconds, the effect of heat treatment becomes insufficient in some cases. In contrast, when the heat treatment time exceeds 12 hours, the membrane material tends to deteriorate.

The polymer electrolyte membrane obtained by the heat treatment can be proton-substituted by immersion into an acidic aqueous solution, as necessary. The polymer electrolyte membrane makes it possible to simultaneously achieve a better balance of proton conductivity and physical durability by molding in this way.

The thickness of the polymer electrolyte membrane is suitably preferably 1 to 2,000 µm. To attain practical-use level of mechanical strength and physical durability of the membrane, the thickness is preferably larger than 1 µm. To decrease the membrane resistance, or to improve the power generation performance, the thickness is preferably smaller than 2,000 µm. Further preferred membrane thickness is 3 to 50 µm, and particularly preferable is 10 to 30 µm. That membrane thickness can be controlled by the solution concentration or by the coating thickness on the substrate.

In addition, to the polymer electrolyte membrane, there can be further added additives such as crystallization nucleating agent, plasticizer, stabilizer, antioxidant, and mold-releasing agent, used for ordinary polymer compounds, within a desired range.

Furthermore, there may be added various polymers, elastomers, fillers, fine particles, various additives, and the like, within a range not adversely affecting the above characteristics to enhance the mechanical strength, heat stability, processability and the like. In addition, the polymer electrolyte membrane may be reinforced with fine porous film, nonwoven cloth, mesh and the like.

The polymer electrolyte form article is applicable in various uses. For example, it is applicable in medical use such as extracorporeal circulation column or artificial skin, filter use, ion-exchange resin use such as anti-chlorine reverse osmosis membrane, various structuring materials, electrochemical use, humidification membrane, antifogging membrane, antistatic membrane, solar cell membrane, and gas barrier material. Also, the polymer electrolyte form article is suitable for artificial muscle and actuator material. Among them, the polymer electrolyte form article is more preferably used in various electrochemical uses. Examples of the electrochemical uses include fuel cell, redox flow battery, water electrolyzer, and chloroalkali electrolyzer. Among them, it is particularly preferably used for a fuel cell.

When the polymer electrolyte composition is used for a polymer electrolyte fuel cell, a polymer electrolyte membrane, an electrode catalyst layer and the like are preferable. Among them, it is suitably used for a polymer electrolyte membrane. The polymer electrolyte composition has high chemical stability, and thus the composition can also be particularly preferably used as the binder of an electrode catalyst layer where electrochemical reaction occurs in the vicinity thereof.

The polymer electrolyte fuel cell has a structure in which a catalyst layer, an electrode substrate and a separator are sequentially laminated on both sides of the polymer electrolyte membrane. Among them, one in which a catalyst layer is laminated on both sides of the electrolyte membrane (i.e., having a layer constitution of catalyst layer/electrolyte membrane/catalyst layer) is called as an electrolyte membrane with a catalyst layer (CCM), and one in which a catalyst layer and a gas diffusion substrate are sequentially laminated on both sides of the electrolyte membrane (i.e., having a layer constitution of gas diffusion substrate/catalyst layer/electrolyte membrane/catalyst layer/gas diffusion substrate) is called as an electrode-electrolyte membrane assembly or a membrane electrode assembly (MEA).

As a method of producing CCM, a coating system in which a catalyst layer paste composition to form a catalyst layer is applied on the surface of the electrolyte membrane and dried is generally carried out.

When a membrane electrode assembly (MEA) is prepared by a press, there can be applied a known method such as "Chemical Plating Methods," described in Journal of Electrochemistry, 1985, 53, p. 261, (Electrochemical Society of Japan), and "Hot press joining of gas-diffusion electrode," described in Electrochemical Science and Technology, 1988, 135, 9, p. 2209. The temperature and the pressure during pressing may be adequately selected depending on the thickness of electrolyte membrane, the water content, the catalyst layer, and the electrode substrate. In addition, press-composite can be applied even when the electrolyte membrane is in a dry state or in a state of absorbing water. Specific press method includes roll press that specifies pressure and clearance, flat press that specifies pressure and the like, and from the viewpoint of industrial productivity and suppression of thermal decomposition of polymer material having an ionic group, the press is preferably performed at a temperature of 0° C. to 250° C. From the viewpoint of protection of electrolyte membrane and of electrode, the press is preferably performed under lower pressure as much as possible, and in the case of flat press, 10 MPa or smaller pressure is preferred. A preferred selectable method is, from the viewpoint of prevention of short-circuit of anode and cathode electrodes, to join the electrode and the electrolyte membrane to thereby form the fuel cell without applying composite-formation by the press process. With that method, when power generation is repeated as the fuel cell, the deterioration of electrolyte membrane presumably originated from the short-circuit position tends to be suppressed, which improves the durability of the fuel cell.

EXAMPLES

Hereinafter, our compositions, membranes, assemblies and fuel cells will be described in more detail referring to examples, but this disclosure is not limited to these examples. The conditions for measuring the physical properties are as follows.

(1) Ion-Exchange Capacity (IEC)

The ion-exchange capacity was measured by neutralization titration described in the following (i) to (iv). The measurements were performed three times, and then the average of them was taken.

(i) An electrolyte membrane was proton-substituted and fully rinsed with pure water. After wiping off the water on the surface of the electrolyte membrane, the membrane was vacuum-dried at 100° C. for 12 hours or more, and the dry weight was obtained.

(ii) 50 mL of an aqueous solution of 5% by weight of sodium sulfate was added to the electrolyte, and the resultant solution was allowed to stand for 12 hours for conducting ion-exchange.

(iii) The generated sulfuric acid was titrated using an aqueous solution of 0.01 mol/L sodium hydroxide. A commercially available 0.1 w/v % phenolphthalein solution for titration was added as the indicator. A point where the color turned light purplish red was defined as the end point.

(iv) The ion-exchange capacity was obtained by the following formula:

Ion-exchange capacity (meq/g)=[Concentration of aqueous solution of sodium hydroxide (mmol/mL)×Titrated amount (mL)]/[Dry weight of sample (g)].

(2) Proton Conductivity (H Conductivity)

The membrane-shaped sample was immersed for 24 hours in pure water at 25° C. Then the sample was held in a thermo-hygrostat at 80° C. and at a relative humidity of 25 to 95% for each 30 minutes at individual steps. After that, the proton conductivity was measured by the controlled potential AC impedance method. The measurement apparatus used was an electrochemical measurement system of Solartron Inc. (Solartron 1287 Electrochemical Interface and Solartron 1255B Frequency Response Analyzer). The controlled potential impedance measurement was performed by the 2-probe method and the proton conductivity was obtained. The AC amplitude was 50 mV. The sample used was a membrane of 10 mm in width and 50 mm in length. The measurement jig was fabricated by a phenol resin, and the measurement portion was opened. The electrode used was platinum plates (2 plates each having a thickness of 100 μm). The electrodes were arranged for the distance therebetween to become 10 mm and to be parallel to each other and orthogonal to the longitudinal direction of the sample membrane, on the front and rear side of the sample membrane.

(3) Number-Average Molecular Weight and Weight-Average Molecular Weight

The number-average molecular weight and the weight-average molecular weight of polymer were measured by GPC. As the integrated analyzer of an ultraviolet ray detector and a differential diffractometer, HLC-8022GPC manufactured by TOSOH Corporation was applied. As the GPC column, two columns of TSK gel Super HM-H (6.0 mm in inner diameter, 15 cm in length) manufactured by TOSOH Corporation were used. The measurement was done using an N-methyl-2-pyrrolidone solvent (an N-methyl-2-pyrrolidone solvent containing 10 mmol/L of lithium bromide) under a condition of 0.1% by weight of sample concentration, 0.2 mL/min of flow rate, at 40° C. The number-average molecular weight and the weight-average molecular weight were obtained in terms of standard polystyrene.

(4) Membrane Thickness

The measurement of membrane thickness was performed by ID-C112 manufactured by Mitsutoyo Co. mounted on a granite comparator stand BSG-20 manufactured by Mitsutoyo Co.

(5) Measurement Method of Purity

Quantitative analysis was performed by Gas chromatography (GC) under the following conditions:

Column: DB-5 (manufactured by J&W Inc.) L=30 m, φ=0.53 mm, D=1.50 μm
Carrier: Helium (Line velocity=35.0 cm/sec)
Analytical Conditions
Inj. temp.; 300° C.
Detect. temp.; 320° C.
Oven; 50° C.×1 min
Rate; 10° C./min
Final; 300° C.×15 min
SP ratio; 50:1.

(6) Measurement of Added Quantity of Additive

The added quantity of the additive in the electrolyte membrane was evaluated by Inductively Coupled Plasma (ICP) Emission spectrophotometric analysis. An electrolyte membrane was cut to a size of 5 cm×5 cm, and the cut sample was dried at 110° C. under reduced pressure for 2 hours. Then the dried sample was weighed precisely and was allowed to stand at 550° C. for 2 days. The residual ash was dissolved in an aqueous solution of 0.1 N nitric acid to completely extract the additive. Thus treated liquid was analyzed by the ICP Emission spectrophotometry to determine the quantity of phosphorus, nitrogen and various metal elements, thereby the quantification of the additive was executed.

(7) Hot Water Resistance of Additive

The hot water resistance of the additive was evaluated by determining the residual rate after immersion in 95° C. hot water. The electrolyte membrane was cut to two rectangular pieces of each about 5 cm in length and about 10 cm in width. The cut sample was immersed in 95° C. hot water for 8 hours to elute the additive. The electrolyte membrane before and after the immersion in hot water was cut to a size of 5 cm×5 cm, respectively. Each of the cut samples was analyzed by the ICP Emission spectrophotometry to determine the content of the additive, and the hot water resistance was evaluated as the residual rate of the additive.

(8) Nuclear Magnetic Resonance (NMR) Spectra

The $^1$H-NMR measurement was performed under the following conditions, to confirm the structure and to quantify the molar composition ratio of the segment (A1) containing an ionic group to the segment (A2) not containing an ionic group. The molar composition ratio was calculated from the integral peak values appearing at 8.2 ppm (originated from disulfonate-4,4'-difluorobenzophenone) and 6.5 to 8.0 ppm (originated from all aromatic protons except for disulfonate-4,4'-difluorobenzophenone).

Apparatus: EX-270 manufactured by JOEL Ltd.
Resonance frequency: 270 MHz ($^1$H-NMR)
Measurement temperature: Room temperature
Dissolving solvent: DMSO-d6
Internal reference substance: TMS (0 ppm)
Cumulative number: 16 times (9) Chemical Stability (A) Molecular Weight Retention Rate As to an electrolyte membrane soluble in N-methylpyrrolidone (NMP), the electrolyte membrane was deteriorated by the following method, and chemical stability was evaluated by making a comparison of the molecular weight between before and after the degradation test.

There were prepared a pair of commercially available electrodes, "ELAT (registered trademark, gas-diffusion electrode for fuel cell, manufactured by BASF GmbH) LT120ENSI" with 5 g/m2 Pt, each cut to 5 cm square. The electrodes were overlapped facing each other to sandwich an electrolyte membrane as the fuel electrode and the oxidation electrode. Hot pressing was performed for 3 minutes at a temperature of 150° C. and a pressure of 5 MPa, and thus the membrane electrode assembly for evaluation was obtained.

Thus obtained membrane electrode assembly was placed on JAM Standard Cell "Ex-1" (25 cm$^2$ of electrode area, manufactured by EIWA Corporation). While keeping the temperature of the assembly at 80° C., hydrogen gas in a low-humidification state (70 mL/min, back pressure 0.1 MPaG) and air (174 mL/min, back pressure 0.05 MPaG) were introduced to the cell, and thus accelerated degradation test in open circuit was performed. After operating the cell of fuel cell for 200 hours under the above conditions, the membrane electrode assembly was taken out, which was then immersed in a mixed solution of ethanol and water, and further treated by ultrasonic wave to remove the catalyst layer. Then, the molecular weight of the remaining polymer electrolyte membrane was measured for evaluation as the molecular weight retention rate.

(B) Open Circuit Voltage Retention Time

As to an electrolyte membrane insoluble in NMP, the electrolyte membrane was deteriorated by the following method, and the chemical stability was evaluated by comparing the holding time of the open circuit voltage.

A membrane electrode assembly was prepared using a similar method to the above, and the assembly was placed on the evaluation cell. Then, under similar conditions to the above, the accelerated degradation test in open circuit was performed. The time until the open circuit voltage decreased to 0.7 V or smaller was evaluated as the open circuit voltage holding time.

(C) Voltage Retention Rate

When even the above (B) evaluation of open circuit voltage holding time made it possible to maintain 0.7 V or larger voltage for 3,000 hours or longer period, the evaluation was stopped, and the chemical durability was evaluated as the voltage retention rate by making a comparison between the initial voltage and the voltage after 3,000 hours.

Synthesis Example 1: Synthesis of Block Copolymer b1

Synthesis of 2,2-bis(4-hydroxyphenyl)-1,3-dioxolane (K-DHBP) Represented by General Formula (G1)

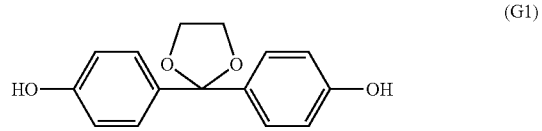

(G1)

To a 500 mL flask equipped with an agitator, a thermometer, and a distilling tube, there were added 49.5 g of 4,4'-dihydroxybenzophenone (DHBP), 134 g of ethylene glycol, 96.9 g of ortho-trimethyl formate, and 0.50 g of p-toluenesulfonic acid hydrate, to thereby be dissolved. The solution was agitated for 2 hours while being kept at a temperature of 78 to 82° C. Furthermore, the internal temperature was gradually increased to 120° C., and the heating was continued until the distilling of methyl formate, methanol, and orthotrimethyl formate completely stops. After cooling of the reaction solution to room temperature, the reaction solution was diluted by ethyl acetate, and then the organic layer was rinsed with 100 mL of a 5% aqueous solution of potassium carbonate. After separating the solution, the solvent was distilled out. 80 mL of dichloromethane was added to the residue, crystal was deposited, then filtered and dried to obtain 52.0 g of 2,2-bis(4-hydroxyphenyl)-1,3-dioxolane. Through the GC analysis of the crystal, 99.8% of 2,2-bis(4-hydroxyphenyl)-1,3-dioxolane and 0.2% of 4,4'-dihydroxybenzophenone were confirmed.

Synthesis of disodium 3,3'-disulfonate-4,4'-difluorobenzophenone Represented by General Formula (G2)

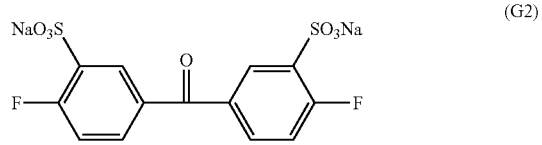

(G2)

109.1 g of 4,4'-difluorobenzophenone (Aldrich reagent) was caused to react in 150 mL of oleum (50% S03) (reagent of Wako Pure Chemical Industries, Ltd.) at 100° C. for 10 hours. Then, the solution was gradually poured into a large volume of water, and after neutralizing the solution by using NaOH, 200 g of sodium chloride was added to precipitate a synthesized product. The precipitated product obtained was separated by filtration, followed by recrystallizetion by using an ethanol aqueous solution, and thus there was obtained disodium 3,3'-disulfonate-4,4'-difluorobenzophenone represented by general formula (G2). The purity was 99.3%. The structure was confirmed by $^1$H-NMR. The impurities were quantitatively analyzed by capillary electrophoresis (organic substances) and by ion chromatography (inorganic substances). Synthesis of oligomer not containing an ionic group, represented by general formula (G3)

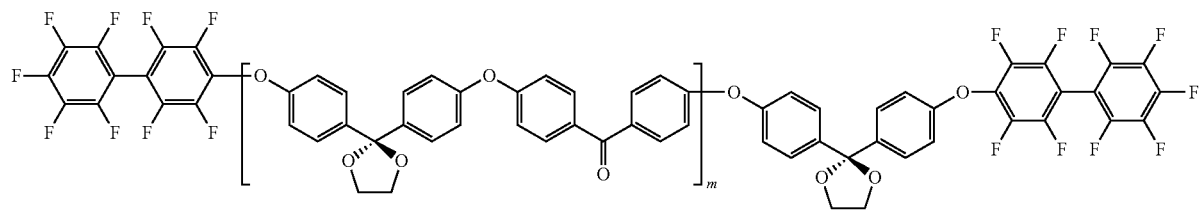

(G3)

where, in formula (G3), m represents a positive integer.

To a 1000 mL three neck flask equipped with an agitator, a nitrogen gas inlet tube, and a Dean-Stark trap, there were added 16.59 g of potassium carbonate (Aldrich reagent, 120 mmol), 25.8 g of K-DHBP (100 mmol), and 20.3 g of 4,4'-difluorobenzophenone (Aldrich reagent, 93 mmol). After nitrogen purge, the resultant content was dewatered in 300 mL of N-methylpyrrolidone (NMP) and 100 mL of toluene at 160° C. Then, the resultant content was heated to remove the toluene, and was polymerized at 180° C. for 1 hour. Purification was performed by reprecipitation through the use of a large quantity of methanol, and thus there was obtained the oligomer not containing an ionic group (terminal OM group wherein the symbol M in the OM group signifies Na or K, and the subsequent expression follows this example). The number-average molecular weight was 10,000.

To a 500 mL three neck flask equipped with an agitator, a nitrogen gas inlet tube, and a Dean-Stark trap, there were added 1.1 g of potassium carbonate (Aldrich reagent, 8 mmol), and 20.0 g (2 mmol) of the oligomer (terminal OM group). After nitrogen purge, the resultant content was dewatered at 100° C. in 100 mL of N-methylpyrrolidone (NMP) and 30 mL of cyclohexane, and heated to remove the cyclohexane. Furthermore, 4.0 g of decafluorobiphenyl (Aldrich reagent, 12 mmol) was added, and the solution caused to react at 105° C. for 1 hour. Purification was performed by reprecipitation through the use of a large quantity of isopropyl alcohol, and thus there was obtained the oligomer not containing an ionic group (terminal fluoro group), represented by formula (G3). The number-average molecular weight was 11,000, and the number-average molecular weight of the oligomer a1' not containing an ionic group was obtained as 10,400 subtracting the linker moiety (molecular weight of 630).

Synthesis of Oligomer Containing an Ionic Group, Represented by General Formula (G4)

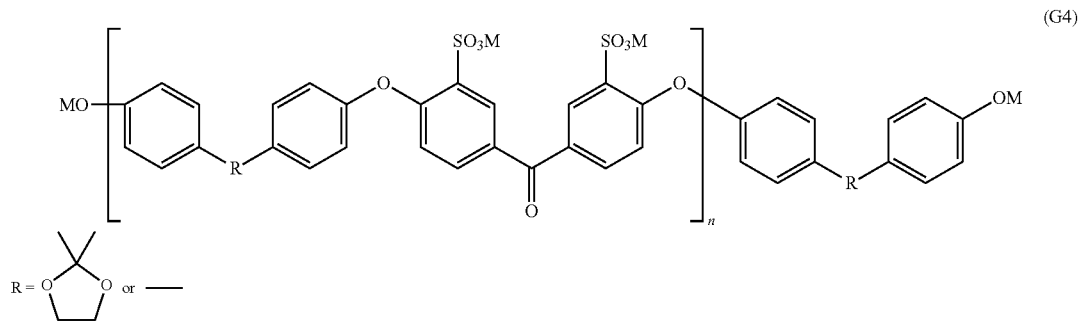

where, in formula (G4), M represents Na or K.

To a 1000 mL three neck flask equipped with an agitator, a nitrogen gas inlet tube, and a Dean-Stark trap, there were added 27.6 g of potassium carbonate (Aldrich reagent, 200 mmol), 12.9 g (50 mmol) of the K-DHBP, 9.3 g of 4,4'-biphenol (Aldrich reagent, 50 mmol), 40.6 g (96 mmol) of disodium 3,3'-disulfonate-4,4'-difluorobenzophenone, and 17.9 g of 18-crown-6-ether (82 mmol, Wako Pure Chemical Industries, Ltd.). After nitrogen purge, the resultant content was dewatered in 300 mL of N-methylpyrrolidone (NMP) and 100 mL of toluene at 170° C. Then, the resultant content was heated to remove the toluene, and polymerized at 180° C. for 1 hour. Purification was performed by reprecipitation through the use of a large quantity of isopropyl alcohol, and thus there was obtained the oligomer containing an ionic group (terminal OM group), represented by formula (G4). The number-average molecular weight was 29,000.

Synthesis of Polyketalketone (PKK)-Based Block Copolymer b1 Using an Oligomer Represented by General Formula (G4) as Segment (A1) Containing an Ionic Group and an Oligomer Represented by General Formula (G3) as Segment (A2) not Containing an Ionic Group To a 500 mL three neck flask equipped with an agitator, a nitrogen gas inlet tube, and a Dean-Stark trap, there were added 0.56 g of potassium carbonate (Aldrich reagent, 4 mmol), and 29 g (1 mmol) of the oligomer a2 containing an ionic group (terminal OM group). After nitrogen purge, the resultant content was dewatered at 100° C. in 100 mL of N-methylpyrrolidone (NMP) and 30 mL of cyclohexane, and then the resultant content heated to remove the cyclohexane. Furthermore, the addition of 11 g (1 mmol) of oligomer a1' not containing an ionic group (terminal fluoro group) causes the solution to react at 105° C. for 24 hours. Purification was performed by reprecipitation through the use of a large quantity of isopropyl alcohol, and thus there was obtained the block copolymer b1. The weight-average molecular weight was 400,000.

The block polymer b1 contained 50 mol % of the constituent unit represented by general formula (51) as segment (A1) containing an ionic group, and 100 mol % of the constituent unit represented by general formula (S2) as segment (A2) not containing an ionic group.

The ion-exchange capacity obtained from neutralization titration was 2.3 meq/g when the block copolymer b1 itself was used as the polymer electrolyte membrane, the molar composition ratio (A1/A2) obtained from $^1$H-NMR was 58 mol/42 mol=1.38, and no residual ketal group was able to be confirmed.

Synthesis Example 2: Synthesis of Block Copolymer b2

Synthesis of Polyethersulfone (PES)-Based Block Copolymer Precursor b2', Structured by the Segment Represented by Formula (G6) and the Segment Represented by Formula (G7)

1.78 g of anhydride nickel chloride were stirred in 15 mL of dimethylsulfoxide at 70° C. 2.37 g of 2,2'-bipyridyl was added to the mixture, and the resultant mixture then agitated at the same temperature for 10 minutes to prepare a nickel-containing solution.

A solution was obtained by dissolving 1.64 g of 2,5-dichlorobenzenesulfonic acid (2,2-dimethylpropyl) ester and 0.55 g of polyethersulfone represented by formula (G5) (Sumica Excel PES5200P, Mn=40,000, Mw=94,000, manufactured by Sumitomo Chemical Co., Ltd.) in 5 mL of dimethylsulfoxide. Furthermore, 1.35 g of zinc powder was added to the solution, and the temperature of the resultant solution adjusted to 70° C. The above-described nickel-containing solution was poured into the solution, and polymerization reaction performed at 70° C. for 4 hours. The reaction mixture was added to 60 mL of methanol, and subsequently, 60 mL of 6 mol/L hydrochloric acid added for agitation of the mixture for 1 hour. The deposited solid was separated by filtration, and the resultant solid dried, and 1.75 g of a gray-white block copolymer precursor b2' (polyarylene precursor) containing the segments represented by formula (G6) and formula (G7) was obtained at a yield of 97%. The weight-average molecular weight was 210,000.

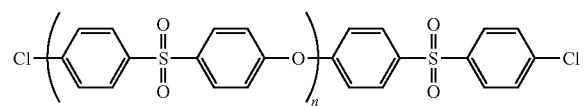

(G5)

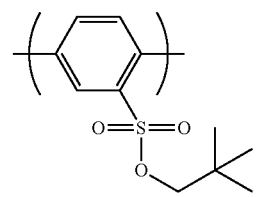

(G6)

-continued

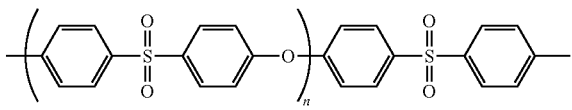
(G7)

Synthesis of Polyethersulfone (PES)-Based Block Copolymer b2, Structured by the Segment Represented by Formula (G7) and the Segment Represented by Formula (G8)

0.25 g of the block copolymer precursor b2' was added to a mixed solution of 0.18 g of lithium bromide monohydrate and 8 mL of N-methyl-2-pyrrolidone, and the mixture caused to react at 120° C. for 24 hours. The reaction mixture was poured into 80 mL of 6 mol/L of hydrochloric acid for agitation for 1 hour. The deposited solid was separated by filtration. The separated solid was dried, and a gray-white block copolymer b2 structured by the segment represented by formula (G7) and the segment represented by formula (G8) was obtained.

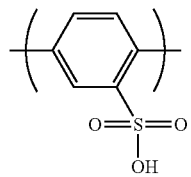
(G8)

The weight-average molecular weight of thus obtained polyarylene was 190,000. When the block copolymer b2 itself was the polymer electrolyte membrane, the ion-exchange capacity obtained by the neutralization titration was 2.02 meq/g.

Synthesis Example 3: Synthesis of Block Copolymer b3

Synthesis of Hydrophobic Oligomer Represented by Formula (G9)

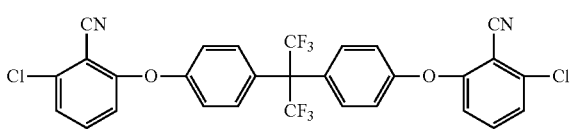
(G9)

To a 1 L three neck flask equipped with an agitator, a thermometer, a cooling tube, a Dean-Stark tube, and a nitrogen gas inlet three-way cock, there were weighed 51.9 g (0.30 mol) of 2,6-dichlorobenzonitrile, 92.8 g (0.27 mol) of 2,2-bis(4-hydroxyphenyl)-1,1,1,3,3,3-hexafluoropropane, and 49.7 g (0.36 mol) of potassium carbonate.

After nitrogen purge, there were further added 363 mL of sulfolane and 181 mL of toluene for agitation of the mixture. The flask was immersed in an oil bath and the content heated and refluxed at 150° C. When the reaction was performed while the water caused by the reaction was subjected to azeotrope with toluene and was removed outside the system via the Dean-Stark tube, the generation of water became almost unable to be confirmed in about 3 hours. After removal of most of the toluene by gradually increasing the reaction temperature, the reaction was continued at 200° C. for 3 hours. Next, 12.9 g (0.076 mol) of 2,6-dichlorobenzonitrile was added and the reaction further performed for 5 hours.

After the obtained reaction liquid was allowed to stand to cool, 100 mL of toluene was added thereto and the liquid diluted. The precipitate of by-product inorganic compounds was removed by filtration, and the filtrate charged into 2 L of methanol. The precipitated product was filtered, collected and dried, which was then dissolved in 250 mL of tetrahydrofuran. The mixture was reprecipitated in 2 L of methanol to obtain 109 g of the target oligomer. The number-average molecular weight of the oligomer was 8,000.

Synthesis of Hydrophilic Monomer Represented by Formula (G10)

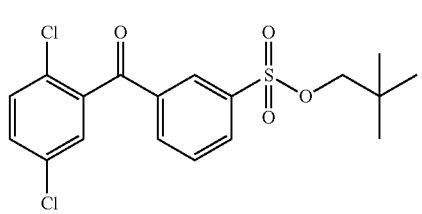
(G10)

To a 3 L three neck flask equipped with an agitator and a cooling tube, there were added 245 g (2.1 mol) of chlorosulfonic acid, followed by 105 g (420 mmol) of 2,5-dichlorobenzophenone. The mixture was caused to react in a 100° C. oil bath for 8 hours. After a predetermined time, the reaction liquid was gradually poured into 1,000 g of crushed ice, and extraction was performed with ethyl acetate. The organic layer was rinsed with a solution of sodium chloride, followed by drying with magnesium sulfate, then the ethyl acetate was distilled out to obtain a light yellow crude crystal of 3-(2,5-dichlorobenzoyl)benzenesulfonic acid chloride. The crude crystal was used as is without purification, at the next step.

41.1 g (462 mmol) of 2,2-dimethyl-1-propanol (neopentyl alcohol) was added to 300 mL of pyridine, and the resultant mixture cooled to about 10° C. The above-obtained crude crystal was gradually added to the cooled mixture for about 30 minutes. After addition of the entire crude crystal, the mixture was further agitated for 30 minutes and caused to react. After reaction, the reaction liquid was poured into 1000 mL of hydrochloric acid aqueous solution and the deposited solid collected. Thus obtained solid was dissolved in ethyl acetate and rinsed with an aqueous solution of sodium hydrogen carbonate and a solution of sodium chloride, followed by drying with magnesium sulfate, then the ethyl acetate was distilled out to obtain a crude crystal. The crude crystal was recrystallized with methanol to obtain a white crystal of 3-(2,5-dichlorobenzoyl)benzenesulfonic acid neopentyl ester represented by the above structural formula.

Synthesis of Polyarylene-Based Block Copolymer b3 Represented by Formula (G11)

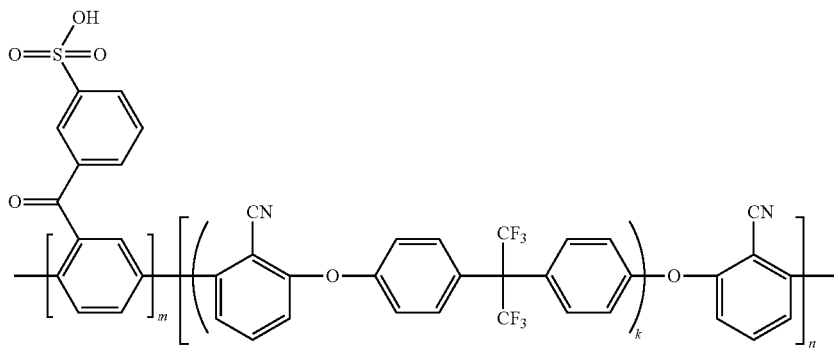

(G11)

166 mL of dried N,N-dimethylacetamide (DMAc) was added, in nitrogen atmosphere, to a 1 L three neck flask equipped with an agitator, a thermometer, and a nitrogen gas inlet tube, containing a mixture of 15.1 g (1.89 mmol) of the hydrophobic oligomer described above, 39.5 g (98.4 mmol) of 3-(2,5-dichlorobenzoyl)benzenesulfonic acid neopentyl ester, 2.75 g (4.2 mmol) of bis(triphenylphosphine)nickel dichloride, 11.0 g (42.1 mmol) of triphenylphosphine, 0.47 g (3.15 mmol) of sodium iodide, and 16.5 g (253 mmol) of zinc.

The reaction system was heated under agitation (ultimately heated to a temperature of 82° C.), and caused to react for 3 hours. During the reaction period, the viscosity increase in the reaction system was observed. The polymerized reaction solution was diluted with 180 mL of DMAc, and the resultant solution agitated for 30 minutes. Then, the reaction mixture was filtered using Celite as the filter aid. Using a 1 L three neck flask equipped with an agitator, 25.6 g (295 mmol) of lithium bromide was added to the filtrate three times (each one third of aliquot part) with an interval of 1 hour. The resultant mixture was caused to react at 120° C. for 5 hours in nitrogen atmosphere. After the reaction, the mixture was cooled to room temperature and poured into 4 L of acetone for solidification. The solidified product was coagulated and airdried, then crushed in a mixer, and the resultant substance rinsed with 1500 mL of 1 N sulfuric acid under agitation. After filtration, the product was rinsed with ion-exchange water until the pH of the rinsing liquid became 5 or larger. Then, the product was dried at 80° C. overnight, and thus 39.1 g of the target block copolymer b3 was obtained. The weight-average molecular weight of the block copolymer was 200,000.

When the block copolymer b3 itself was the polymer electrolyte membrane, the ion-exchange capacity obtained by the neutralization titration was 2.3 meq/g.

Example 1

A 20 g of the block copolymer b1 obtained in Synthesis Example 1 was dissolved in 80 g of NMP. 200 mg of 1,2-bis(diphenylphosphino)ethane (hereinafter referred to as "DPPE," manufactured by Aldrich) was added to the solution, then the mixture agitated for 3 minutes using an agitator at 20,000 rpm to obtain a transparent solution of 20% by mass of the concentration of polymer. The solubility of the polymer was extremely good. The resulting solution was pressure-filtered using a glass fiber filter, followed by flow-casting coating on a glass substrate. After drying at 100° C. for 4 hours, the coating was heat-treated under nitrogen atmosphere at 150° C. for 10 minutes to obtain a polyketalketone membrane (15 μm of membrane thickness). The membrane was immersed at 95° C. for 24 hours in an aqueous solution of 10% by weight of sulfuric acid for proton substitution and deprotection reaction, and then the membrane was immersed for 24 hours in a large excessive volume of pure water for full rinsing.

Subsequently, 0.30 g of 5-amino-1,10-phenanthroline (1.5 mmol) was dissolved in pure water to prepare a 50 μmol/L 5-amino-1,10-phenanthroline solution in 30 L. In this solution, 20 g of the polyether ketone membrane was immersed for 72 hours to contain 5-amino-1,10-phenanthroline, and thus the polymer electrolyte membrane was obtained.

Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 2

The electrolyte membrane was obtained in the same manner as in Example 1 except that 5-amino-1,10-phenanthroline was changed to 0.28 g of 1,10-phenanthroline. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 3

The electrolyte membrane was obtained in the same manner as in Example 1 except that 5-amino-1,10-phenanthroline was changed to 0.51 g of bathphenanthroline. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 4

The electrolyte membrane was obtained in the same manner as in Example 1 except that 5-amino-1,10-phenanthroline was changed to 0.25 g of 2,2'-bipyridyl. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 5

The electrolyte membrane was obtained in the same manner as in Example 1 except that DPPE was changed to triphenylphosphine. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 6

The electrolyte membrane was obtained in the same manner as in Example 1 except that 4 g of DPPE, 9 g of 5-amino-1,10-phenanthroline and 90 L of 5-amino-1,10-phenanthroline aqueous solution were used, and the immersion time of the polyether ketone membrane was changed to 120 hours. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 7

The electrolyte membrane was obtained in the same manner as in Example 6 except that 2 mg of DPPE, 6 mg of 5-amino-1,10-phenanthroline and 15 L of 5-amino-1,10-phenanthroline aqueous solution were used. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Example 8

The electrolyte membrane was obtained in the same manner as in Example 1 except that DPPE was changed to (R)-(+)-2,2'-bis(diphenylphosphino)-1,1'-binaphthyl (BINAP), and 5-amino-1,10-phenanthroline was changed to 0.28 g of 3,3'-dimethyl-2,2'-bipyridyl. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 9

The electrolyte membrane was obtained in the same manner as in Example 1 except that DPPE was changed to 1,2-bis(diphenylphosphino)benzene. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 10

The electrolyte membrane was obtained in the same manner as in Example 1 except that DPPE was changed to 1,2-bis(diphenylphosphino)decane. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 11

The electrolyte membrane was obtained in the same manner as in Example 1 except that DPPE was changed to diphenylmethoxyphosphine. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Example 12

The electrolyte membrane was obtained in the same manner as in Example 1 except that DPPE was changed to dimethoxyphenylphosphine. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Example 13

The electrolyte membrane was obtained in the same manner as in Example 1 except that DPPE was changed to triphenoxyphosphine. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Example 14

The electrolyte membrane was obtained in the same manner as in Example 1 except that the block polymer b1 was changed to Nafion (registered trademark) NRE211CS (manufactured by DuPont) which is a fluorine-based electrolyte polymer. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Example 15

The electrolyte membrane was obtained in the same manner as in Example 1 except that the block polymer b1 was changed to the PES-based block copolymer b2. Since the obtained membrane was soluble in NMP, the molecular weight retention rate was measured as the durability test. In addition, there were measured the ion-exchange capacity, the hot water resistance, and the proton conductivity at 80° C. and 25% RH of the obtained electrolyte membrane. The result is shown in Table 1.

Example 16

The electrolyte membrane was obtained in the same manner as in Example 1 except that the block polymer b1 was changed to the polyarylene-based block copolymer b3. Since the obtained membrane was soluble in NMP, the molecular weight retention rate was measured as the durability test. In addition, there were measured the ion-exchange capacity, the hot water resistance, and the proton conductivity at 80° C. and 25% RH of the obtained electrolyte membrane. The result is shown in Table 1.

Example 17

Synthesis of Complex of DPPE and Cerium Nitrate (III)

2.5 g (6.28 mmol) of DPPE and 680 mg (1.57 mmol) of cerium nitrate hexahydrate were added to a 100 mL recovery flask. 50 mL of ethanol was poured into the mixture and the mixture agitated at 25° C. for 24 hours. The white suspension was concentrated in a rotary evaporator and the solvent removed. Thus obtained white solid was used as is as the additive, without purification.

Manufacture of Polymer Electrolyte Membrane Containing DPPE-Cerium Complex (DPPE-Ce) and 5-amino-1,10-phenanthroline The electrolyte membrane was obtained in the same manner as in Example 1 except that DPPE was changed to the DPPE-Ce described above. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 18

The electrolyte membrane was obtained in the same manner as in Example 1 except that DPPE was changed to dichloro[(R)-(+)-2,2'-bis(diphenylphosphino)-1,1'-binaphthyl]ruthenium(II) (BINAP-Ru). Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 19

The electrolyte membrane was obtained in the same manner as in Example 1 except that DPPE was changed to tetrakis(triphenylphosphine)platinum(0) complex. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 20

Furthermore, 20 g of the electrolyte membrane obtained in Example 1 was immersed for 72 hours in 30 L of an aqueous solution obtained by dissolving 21.7 mg (0.125 mmol) of manganese acetate in pure water to contain manganese acetate, and thus the polymer electrolyte membrane was obtained. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 21

The electrolyte membrane was obtained in the same manner as in Example 1 except that 5-amino-1,10-phenanthroline was changed to 0.54 g of dichloro(1,10-phenanthroline)palladium(II). Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 22

The electrolyte membrane was obtained in the same manner as in Example 1 except that 5-amino-1,10-phenanthroline was changed to 0.63 g of (2,2'-bipyridine)dichloroplatinum(II). Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 23

The electrolyte membrane was obtained in the same manner as in Example 1 except that 5-amino-1,10-phenanthroline was changed to 0.67 g of dichloro(1,10-phenanthroline)platinum(II). Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 24

Furthermore, 20 g of the electrolyte membrane obtained in Example 3 was immersed for 72 hours in 30 L of an aqueous solution obtained by dissolving 32.7 mg (0.125 mmol) of ruthenium chloride trihydrate in pure water to contain ruthenium chloride, and thus the polymer electrolyte membrane was obtained. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Example 25

Furthermore, 20 g of the electrolyte membrane obtained in Example 2 was immersed for 72 hours in 30 L of an aqueous solution obtained by dissolving 36.4 mg (0.125 mmol) of cobalt nitrate hexahydrate in pure water to contain cobalt nitrate, and thus the polymer electrolyte membrane was obtained. Since the obtained membrane was insoluble in NMP, the molecular weight retention rate was not able to be measured, and thus the open circuit voltage holding time was measured as the durability test. However, the evaluation was not completed within 3,000 hours, and thus the chemical durability of the electrolyte membrane was evaluated as the voltage retention rate. In addition, there were measured the ion-exchange capacity, the hot water resistance, and the proton conductivity at 80° C. and 25% RH of the obtained electrolyte membrane. The result is shown in Table 1.

Comparative Example 1

The electrolyte membrane was obtained in the same manner as in Example 1 except that the amount of DPPE was changed to 0.4 g, and 5-amino-1,10-phenanthroline was not used. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Comparative Example 2

The electrolyte membrane was obtained in the same manner as in Example 1 except that the amount of 5-amino-1,10-phenanthroline was changed to 0.6 g, and DPPE was not used. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Comparative Example 3

The electrolyte membrane was obtained in the same manner as in Example 1 except that the amount of DPPE was changed to 0.8 g, and 5-amino-1,10-phenanthroline was not used. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Comparative Example 4

The electrolyte membrane was obtained in the same manner as in Example 1 except that the amount of 5-amino-1,10-phenanthroline was changed to 1.2 g, and DPPE was not used. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Comparative Example 5

The electrolyte membrane was obtained in the same manner as in Example 1 except that DPPE and 5-amino-1,10-phenanthroline were not used. Since the obtained membrane was insoluble in NMP, the molecular weight retention rate was not able to be measured, and thus the open circuit voltage holding time was measured as the durability test. In addition, there were measured the ion-exchange capacity and the proton conductivity at 80° C. and 25% RH of the obtained electrolyte membrane. The result is shown in Table 1.

Comparative Example 6

The electrolyte membrane was obtained in the same manner as in Example 14 except that DPPE and 5-amino-1,10-phenanthroline were not used. Since the obtained membrane was insoluble in NMP, the molecular weight retention rate was not able to be measured, and thus the open circuit voltage holding time was measured as the durability test. In addition, there were measured the ion-exchange capacity and the proton conductivity at 80° C. and 25% RH of the obtained electrolyte membrane. The result is shown in Table 1.

Comparative Example 7

The electrolyte membrane was obtained in the same manner as in Example 15 except that DPPE and 5-amino-1,10-phenanthroline were not used. Since the obtained membrane was soluble in NMP, the molecular weight retention rate was measured as the durability test. In addition, there were measured the ion-exchange capacity and the proton conductivity at 80° C. and 25% RH of the obtained electrolyte membrane. The result is shown in Table 1.

Comparative Example 8

The electrolyte membrane was obtained in the same manner as in Example 16 except that DPPE and 5-amino-1,10-phenanthroline were not used. Since the obtained membrane was soluble in NMP, the molecular weight retention rate was measured as the durability test. In addition, there were measured the ion-exchange capacity and the proton conductivity at 80° C. and 25% RH of the obtained electrolyte membrane. The result is shown in Table 1.

Comparative Example 9

The electrolyte membrane was obtained in the same manner as in Example 17 except that 5-amino-1,10-phenanthroline was not used. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Comparative Example 10

The electrolyte membrane was obtained in the same manner as in Example 22 except that DPPE was not used. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Comparative Example 11

The electrolyte membrane was obtained in the same manner as in Example 13 except that 5-amino-1,10-phenanthroline was not used. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Comparative Example 12

The electrolyte membrane was obtained in the same manner as in Example 14 except that 5-amino-1,10-phenanthroline was not used. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Comparative Example 13

The electrolyte membrane was obtained in the same manner as in Example 14 except that DPPE was not used. Since the obtained membrane was insoluble in NMP, the molecular weight retention rate was not able to be measured, and thus the open circuit voltage holding time was measured as the durability test. In addition, there were measured the ion-exchange capacity, the hot water resistance, and the proton conductivity at 80° C. and 25% RH of the obtained electrolyte membrane. The result is shown in Table 1.

Comparative Example 14

The electrolyte membrane was obtained in the same manner as in Example 15 except that 5-amino-1,10-phenanthroline was not used. Since the obtained membrane was soluble in NMP, the molecular weight retention rate was measured as the durability test. In addition, there were measured the ion-exchange capacity, the hot water resistance, and the proton conductivity at 80° C. and 25% RH of the obtained electrolyte membrane. The result is shown in Table 1.

Comparative Example 15

The electrolyte membrane was obtained in the same manner as in Example 15 except that DPPE was not used. Since the obtained membrane was soluble in NMP, the molecular weight retention rate was measured as the durability test. In addition, there were measured the ion-exchange capacity, the hot water resistance, and the proton conductivity at 80° C. and 25% RH of the obtained electrolyte membrane. The result is shown in Table 1.

Comparative Example 16

The electrolyte membrane was obtained in the same manner as in Example 16 except that DPPE was not used. Since the obtained membrane was soluble in NMP, the molecular weight retention rate was measured as the durability test. In addition, there were measured the ion-exchange capacity, the hot water resistance, and the proton conductivity at 80° C. and 25% RH of the obtained electrolyte membrane. The result is shown in Table 1.

Comparative Example 17

The electrolyte membrane was obtained in the same manner as in Example 16 except that 5-amino-1,10-phenanthroline was not used. Since the obtained membrane was soluble in NMP, the molecular weight retention rate was measured as the durability test. In addition, there were measured the ion-exchange capacity, the hot water resistance, and the proton conductivity at 80° C. and 25% RH of the obtained electrolyte membrane. The result is shown in Table 1.

Comparative Example 18

20 g of the block copolymer b1 obtained in Synthesis Example 1 was dissolved in 80 g of NMP, further, 45 mg of cerium nitrate was added, and the mixture was stirred at 20,000 rpm. The solution viscosity was increased and gelated during stirring, thus pressure-filtration using a glass fiber filter was difficult, and the mixture could not be subjected to membrane-formation.

TABLE 1

| | Polymer Electrolyte Composition | | | | | Evaluation Result | | | | | |
|---|---|---|---|---|---|---|---|---|---|---|---|
| | Ionic group-containing polymer (A) | Phosphorus-containing Additive (B) | Nitrogen-containing aromatic additive (C) | Content of (B) + (C) (In electrolyte membrane) (w %) | Transition metal | IEC (meq/g) | H+ conductivity (mS/cm) | Hot water resistance (%) | Open circuit holding time (h) | Voltage holding rate (%) | Molecular weight holding rate (%) |
| Example 1 | b1 | DPPE | 5-Amino-1,10-phenanthroline | 1.5 | — | 2.25 | 3.0 | 95 | >3000 | 97 | — |
| Example 2 | b1 | DPPE | 1,10-Phenanthroline | 1.5 | — | 2.23 | 2.8 | 91 | >3000 | 94 | — |
| Example 3 | b1 | DPPE | Batho-1,10-Phenanthroline | 1.5 | — | 2.23 | 2.7 | 95 | >3000 | 95 | — |
| Example 4 | b1 | DPPE | 2,2'-Bipyridyl | 1.5 | — | 2.23 | 2.8 | 93 | >3000 | 92 | — |
| Example 5 | b1 | Triphenylphosphine | 5-Amino-1,10-phenanthroline | 1.5 | — | 2.25 | 2.9 | 92 | >3000 | 93 | — |
| Example 6 | b1 | DPPE | 5-Amino-1,10-phenanthroline | 35 | — | 1.60 | 1.3 | 99 | >3000 | 99 | — |
| Example 7 | b1 | DPPE | 5-Amino-1,10-phenanthroline | 0.02 | — | 2.27 | 3.2 | 85 | 2850 | — | — |
| Example 8 | b1 | BINAP | 3,3'-Dimethyl-2,2'-bipyridyl | 1.5 | — | 2.22 | 2.5 | 90 | >3000 | 91 | — |
| Example 9 | b1 | 1,2-Bis(diphenyl-phosphino)benzene | 5-Amino-1,10-phenanthroline | 1.5 | — | 2.25 | 2.5 | 96 | >3000 | 94 | — |
| Example 10 | b1 | 1,2-Bis(diphenyl-phosphino)decane | 5-Amino-1,10-phenanthroline | 1.5 | — | 2.25 | 2.9 | 92 | >3000 | 91 | — |
| Example 11 | b1 | Diphenylmethoxy-phosphine | 5-Amino-1,10-phenanthroline | 1.5 | — | 2.26 | 3.1 | 90 | >3000 | 88 | — |
| Example 12 | b1 | Dimethoxyphenyl-phosphine | 5-Amino-1,10-phenanthroline | 1.5 | — | 2.26 | 3.2 | 87 | >3000 | 85 | — |
| Example 13 | b1 | Triphenoxyphosphine | 5-Amino-1,10-phenanthroline | 1.5 | — | 2.26 | 3.3 | 75 | 2750 | — | — |
| Example 14 | NRE211CS | DPPE | 5-Amino-1,10-phenanthroline | 1.5 | — | 0.87 | 2.0 | 95 | 2700 | — | — |
| Example 15 | b2 | DPPE | 5-Amino-1,10-phenanthroline | 1.5 | — | 1.78 | 1.8 | 91 | — | — | 92 |
| Example 16 | b3 | DPPE | 5-Amino-1,10-phenanthroline | 1.5 | — | 2.20 | 1.9 | 89 | — | — | 94 |
| Example 17 | b1 | DPPE-Ce | 5-Amino-1,10-phenanthroline | 1.5 | — | 2.10 | 2.6 | 88 | >3000 | 97 | — |
| Example 18 | b1 | BINAP-Ru | 5-Amino-1,10-phenanthroline | 1.5 | — | 2.11 | 2.5 | 92 | >3000 | 95 | — |
| Example 19 | b1 | Tetrakis(triphenyl-phosphine)platinum(0) complex | 5-Amino-1,10-phenanthroline | 1.5 | — | 2.13 | 2.7 | 90 | >3000 | 95 | — |
| Example 20 | b1 | DPPE | 5-Amino-1,10-phenanthroline | 1.5 | Manganese acetate | 2.10 | 2.6 | 89 | >3000 | 97 | — |
| Example 21 | b1 | DPPE | Dichloro(1,10-phenanthroline) palladium(II) | 1.5 | — | 2.12 | 2.7 | 88 | >3000 | 96 | — |
| Example 22 | b1 | DPPE | (2,2'-Bipyridine) dichloroplatinum(II) | 1.5 | — | 2.14 | 2.8 | 86 | >3000 | 94 | — |
| Example 23 | b1 | DPPE | Dichloro(1,10-phenanthroline) platinum(II) | 1.5 | — | 2.11 | 2.6 | 88 | >3000 | 97 | — |
| Example 24 | b1 | DPPE | Batho-1,10-Phenanthroline | 1.5 | Ruthenium chloride | 2.10 | 2.6 | 90 | >3000 | 96 | — |
| Example 25 | b1 | DPPE | 1,10-Phenanthroline | 1.5 | Cobalt nitrate | 2.11 | 2.7 | 89 | >3000 | 95 | — |
| Comparative Example 1 | b1 | DPPE | — | 2 | — | 2.20 | 2.2 | 92 | 2850 | — | — |
| Comparative Example 2 | b1 | — | 5-Amino-1,10-phenanthroline | 1 | — | 2.23 | 2.8 | 87 | 2610 | — | — |
| Comparative Example 3 | b1 | DPPE | — | 4 | — | 2.16 | 1.9 | 94 | 2950 | — | — |

TABLE 1-continued

| | Polymer Electrolyte Composition | | | | | Evaluation Result | | | | |
|---|---|---|---|---|---|---|---|---|---|---|
| | Ionic group-containing polymer (A) | Phosphorus-containing Additive (B) | Nitrogen-containing aromatic additive (C) | Content of (B) + (C) (In electrolyte membrane) (w %) | Transition metal | IEC (meq/g) | H+ conductivity (mS/cm) | Hot water resistance (%) | Open circuit holding time (h) | Voltage holding rate (%) | Molecular weight holding rate (%) |
| Comparative Example 4 | b1 | — | 5-Amino-1,10-phenanthroline | 2 | — | 2.15 | 2.6 | 88 | 2820 | — | — |
| Comparative Example 5 | b1 | — | — | 0 | — | 2.30 | 3.4 | — | 1600 | — | — |
| Comparative Example 6 | NRE211CS | — | — | 0 | — | 0.92 | 2.5 | — | 250 | — | — |
| Comparative Example 7 | b2 | — | — | 0 | — | 2.02 | 2.3 | — | — | — | 58 |
| Comparative Example 8 | b3 | — | — | 0 | — | 2.30 | 2.6 | — | — | — | 62 |
| Comparative Example 9 | b1 | DPPE-Ce | — | 1 | — | 2.12 | 2.7 | 82 | 2850 | — | — |
| Comparative Example 10 | b1 | — | (2,2'-Bipyridine) dichloroplatinum(II) | 0.5 | — | 2.16 | 2.9 | 81 | 2700 | — | — |
| Comparative Example 11 | b1 | Triphenoxyphosphine | — | 1 | — | 2.27 | 3.3 | 54 | 2010 | — | — |
| Comparative Example 12 | NRE211CS | DPPE | — | 1 | — | 0.87 | 2.1 | 94 | 800 | — | — |
| Comparative Example 13 | NRE211CS | — | 5-Amino-1,10-phenanthroline | 0.5 | — | 0.90 | 2.2 | 90 | 2000 | — | — |
| Comparative Example 14 | b2 | DPPE | — | 1 | — | 1.92 | 2.0 | 90 | — | — | 73 |
| Comparative Example 15 | b2 | — | 5-Amino-1,10-phenanthroline | 0.5 | — | 1.85 | 2.1 | 85 | — | — | 81 |
| Comparative Example 16 | b3 | — | 5-Amino-1,10-phenanthroline | 0.5 | — | 2.20 | 2.3 | 84 | — | — | 80 |
| Comparative Example 17 | b3 | DPPE | — | 1 | — | 2.1 | 2.1 | 88 | — | — | 71 |
| Comparative Example 18 | b1 | — | — | 0 | Cerium nitrate | Unmeasurable | | | | | |

The invention claimed is:

1. A polymer electrolyte composition comprising an ionic group-containing polymer (A), a phosphorus-containing additive (B), and a nitrogen-containing aromatic additive (C), the phosphorus-containing additive (B) being at least one selected from a compound represented by general formula (B1) and a compound represented by general formula (B2), and the nitrogen-containing aromatic additive (C) being at least one selected from a compound represented by general formula (C1) and a compound represented by general formula (C2):

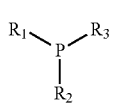
(B1)

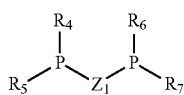
(B2)

where, in formulae (B1) and (B2), $R_1$ to $R_7$ each independently represent a substituent selected from hydrocarbon groups having a straight chain, a cyclic, or a branched structure, represented by general formula $C_mH_n$ (m and n are an integer number), alkoxy groups having a straight chain, a cyclic, or a branched structure, represented by general formula $OC_mH_n$ (m and n are an integer number), halogen atoms and a hydrogen atom; $Z_1$ represents a divalent substituent selected from hydrocarbon groups having a straight chain, a cyclic, or a branched structure, represented by general formula $C_mH_n$ (m and n are an integer number) and alkoxy groups having a straight chain, a cyclic, or a branched structure, represented by general formula $OC_mH_n$ (m and n are an integer number) or $OC_mH_nO$ (m and n are an integer number); m and n are independent in each formula; and $R_1$ to $R_7$, and $Z_1$ may arbitrarily bind to form a cyclic structure as represented by general formulae (B1a) and (B2a):

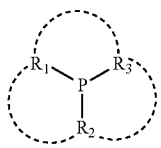
(B1a)

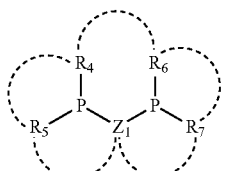
(B2a)

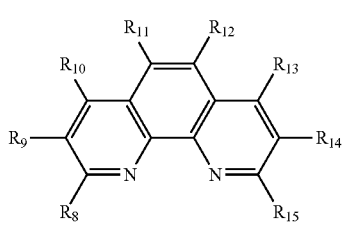
(C1)

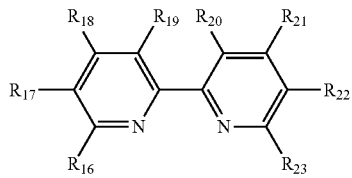
(C2)

where, in general formulae (C1) and (C2), $R_8$ to $R_{23}$ each independently represent a substituent selected from hydrocarbon groups having a straight chain, a cyclic, or a branched structure, represented by general formula $C_mH_n$ (m and n are an integer number), alkoxy groups having a straight chain, a cyclic, or a branched structure, represented by general formula $OC_mH_n$ (m and n are an integer number), halogen atoms, a hydrogen atom, carboxyl groups, carboxylate groups, sulfonic acid groups, sulfate groups, hydroxyl groups, amino groups, cyano groups and nitro groups; and m and n are independent in each formula.

2. The polymer electrolyte composition according to claim 1, wherein the phosphorus-containing additive (B) is at least one selected from bis(diphenylphosphino)methane, bis(diphenylphosphino)ethane, bis(diphenylphosphino)propane, bis(diphenyl-phosphino)butane, bis(diphenylphosphino)pentane, bis(diphenylphosphino)hexane, bis(diphenylphosphino)pentane, bis(diphenylphosphino)octane, bis(diphenylphosphino)nonane, bis(diphenyl-phosphino)decane, bis[bis(pentafluorophenyl)phosphino]ethane, bis(diphenylphosphino)ethylene, bis(diphenylphosphino)acetylene, bis[(phenylpropane sulfonic acid)phosphine]butane and salts thereof, ((diphenylphosphino)phenyl)diphenylphosphine, bis(dimethylphosphino)methane, bis(dimethylphosphino)ethane, bis(diethylphosphino)ethane, bis(dicyclohexylphosphino)methane, bis(dicyclohexylphosphino)ethane, bis(dicyclohexylphosphino)propane, bis(dicyclohexyl-phosphino)butane, bis(diphenylphosphino)benzene, bis(diphenylphosphinophenyl)ether, bis(diphenylphosphino)benzophenone, BINAP, bis(diphenylphosphinomethyl)benzene, bis(dicyclohexylphosphinophenyl)ether, bis(dicyclohexylphosphino)benzophenone, phenylenebiphosphine, and tetraphenylbiphosphine.

3. The polymer electrolyte composition according to claim 1, wherein the nitrogen-containing aromatic additive (C) is a compound in which at least one of $R_8$ to $R_{15}$ in general formula (C1) is an amino group, or a compound in which at least one of $R_{16}$ to $R_{23}$ in general formula (C2) is an amino group.

4. The polymer electrolyte composition according to claim 1, wherein the nitrogen-containing aromatic additive (C) is at least one selected from general formulae (C3) to (C13):

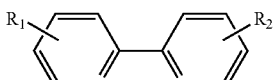
(C3)

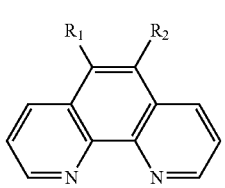
(C4)

-continued

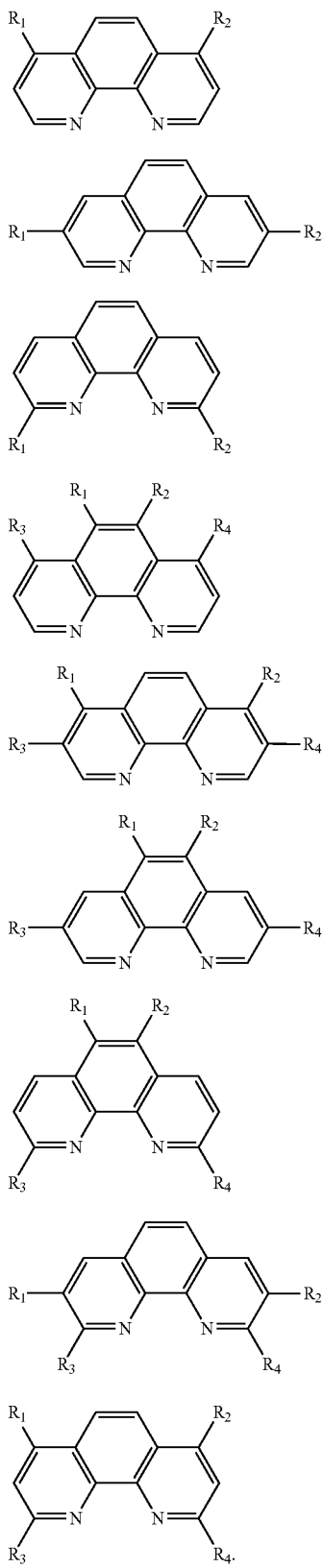

5. The polymer electrolyte composition according to claim 1, wherein total content of the phosphorus-containing additive (B) and the nitrogen-containing aromatic additive (C) is 0.01% by weight or larger and 15% by weight or smaller relative to the entire polymer electrolyte composition.

6. The polymer electrolyte composition according to claim 1, further comprising at least one transition metal selected from the group consisting of Ce, Mn, Ti, Zr, V, Cr, Mo, W, Ru, Co, Rh, Ir, Ni, Pd, Pt, Ag, and Au.

7. The polymer electrolyte composition according to claim 1, wherein the ionic group-containing polymer (A) is a hydrocarbon-based polymer having an aromatic ring in the main chain.

8. The polymer electrolyte composition according to claim 7, wherein the ionic group-containing polymer (A) is an aromatic polyetherketone-based polymer.

9. The polymer electrolyte composition according to claim 1, wherein the ionic group-containing polymer (A) is a block polymer containing a segment (A1) containing an ionic group and a segment (A2) not containing an ionic group.

10. The polymer electrolyte composition according to claim 9, wherein segment (A1) containing an ionic group contains a constituent unit represented by general formula (S1) and segment (A2) not containing an ionic group contains a constituent unit represented by general formula (S2):

$$*—Ar^1—R—Ar^2—O—Ar^3—R—Ar^4—O—* \quad (S1)$$

where, in general formula (S1), $Ar^1$ to $Ar^4$ each represent an arbitrary divalent arylene group; at least one of $Ar^1$ and $Ar^2$ has an ionic group as a substituent; $Ar^3$ and $Ar^4$ may or may not contain an ionic group as a substituent; $Ar^1$ to $Ar^4$ may each be arbitrarily substituted with a group other than an ionic group; $Ar^1$ to $Ar^4$ may be the same or different for every constituent unit; R represents a ketone group or a protective group that may be induced to a ketone group, and each may be the same or different; and the symbol * signifies a bond moiety with general formula (S1) or with other constituent unit;

$$*—Ar^5—R—Ar^6—O—Ar^7—R—Ar^8—O—* \quad (S2)$$

where, in general formula (S2), $Ar^5$ to $Ar^8$ each represent an arbitrary divalent arylene group, may be arbitrarily substituted, and have no ionic group; $Ar^5$ to $Ar^8$ may be the same or different for every constituent unit; R represents a ketone group or a protective group that may be induced to a ketone group, and each may be the same or different; and the symbol * signifies a bond moiety with general formula (S2) or with other constituent unit.

11. The polymer electrolyte composition according to claim 1, wherein an ionic group of the ionic group-containing polymer (A) is a sulfonic acid group.

12. A polymer electrolyte membrane composed of the polymer electrolyte composition according to claim 1.

13. A polymer electrolyte membrane with a catalyst layer, which is composed of the polymer electrolyte composition according to claim 1.

14. A membrane electrode assembly composed of the polymer electrolyte composition according to claim 1.

15. A polymer electrolyte fuel cell composed of the polymer electrolyte composition according to claim 1.

* * * * *